(12) United States Patent
Sako et al.

(10) Patent No.: US 8,006,102 B2
(45) Date of Patent: *Aug. 23, 2011

(54) METHOD AND APPARATUS FOR TRANSMITTING CONTENT DATA AND RECORDING AND/OR REPRODUCING APPARATUS

(75) Inventors: Yoichiro Sako, Tokyo (JP); Tatsuya Inokuchi, Kanagawa (JP); Shunsuke Furukawa, Tokyo (JP)

(73) Assignee: Sony Corporation (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/214,639

(22) Filed: Jun. 20, 2008

(65) Prior Publication Data

US 2008/0263372 A1    Oct. 23, 2008

Related U.S. Application Data

(63) Continuation of application No. 10/220,194, filed as application No. PCT/JP01/11589 on Dec. 27, 2001, now Pat. No. 7,454,628.

(30) Foreign Application Priority Data

Dec. 28, 2000 (JP) ................ P2000-403467
May 30, 2001 (JP) ................ P2001-163126

(51) Int. Cl.
| | |
|---|---|
| G06F 11/30 | (2006.01) |
| G06F 7/04 | (2006.01) |
| H04L 9/00 | (2006.01) |
| H04K 1/00 | (2006.01) |
| H04L 9/08 | (2006.01) |
| H04J 13/00 | (2011.01) |
| G06F 12/14 | (2006.01) |
| G09C 1/00 | (2006.01) |
| G11B 20/10 | (2006.01) |

(52) U.S. Cl. ............. 713/193; 726/26; 705/51; 380/277
(58) Field of Classification Search .................. 713/193; 726/26; 705/51; 380/277; 386/95
See application file for complete search history.

(56) References Cited

U.S. PATENT DOCUMENTS 6,259,858 B1 * 7/2001 Ando et al. ............. 386/95
(Continued)

FOREIGN PATENT DOCUMENTS

EP   0 506 435 A2   9/1992
(Continued)

OTHER PUBLICATIONS

Piao, Chunhui; Fan, Zhenjiang; Yang, Chunyan; Han, Xufang; "Research on RFID security protocol based on grouped tags and re-encryption scheme"; Wireless Communications, Networking and Information Security (WCNIS), 2010 IEEE International Conference; Publication Year Mar. 2010 , pp. 568-572.*

(Continued)

Primary Examiner — Matthew B Smithers
Assistant Examiner — Courtney D Fields
(74) Attorney, Agent, or Firm — Lerner, David, Littenberg, Krumholz & Mentlik, LLP

(57) ABSTRACT

A data transmission method and apparatus for transmitting data, such as encrypted content data. A device that is to be a destination of transmission is authenticated. If the device has not been authenticated, encrypted data read out from a storage unit is decrypted to give decoded data which then is re-encrypted based on innate key data acquired from the device that is to be the destination of transmission to give re-encrypted data. The re-encrypted data is then transmitted to the device that is to be a destination of transmission.

29 Claims, 12 Drawing Sheets

U.S. PATENT DOCUMENTS

| | | |
|---|---|---|
| 6,367,019 B1 | 4/2002 | Ansell et al. |
| 6,834,348 B1 * | 12/2004 | Tagawa et al. ............... 713/193 |
| 7,454,628 B2 * | 11/2008 | Sako et al. .................... 713/193 |

FOREIGN PATENT DOCUMENTS

| | | |
|---|---|---|
| EP | 0 800 312 A1 | 10/1997 |
| EP | 1 001 624 A2 | 5/2000 |
| EP | 1 054 398 A2 | 11/2000 |
| EP | 1 056 015 A1 | 11/2000 |
| EP | 1845527 | 10/2007 |
| JP | 08130516 A | 5/1996 |
| JP | 09 326166 | 12/1997 |
| JP | 10-302393 | 11/1998 |
| JP | 11 102572 A | 4/1999 |
| JP | 11 353796 | 12/1999 |
| JP | 2000-295208 | 10/2000 |
| JP | 2000-308129 | 11/2000 |
| JP | 2000-330871 | 11/2000 |
| JP | 2000-339851 | 12/2000 |
| WO | 00/22777 A1 | 4/2000 |
| WO | WO 2005006706 A1 * | 1/2005 |

OTHER PUBLICATIONS

Keisuke Kamimura, "Gnutella, rediscovering the potential of the Internet", IPSJ: Information Processing Society of Japan Kenkyu Hokoku, 2000-EIP-9, vol. 2000, No. 77:33-38 [2000].

Sabrina De Capitani di Vimercati, Sara Foresti, Sushil Jajodia, Stefano Paraboschi, Pierangela Samarati, "Over-encryption: Management of Access Control Evolution on Outsourced Data", Sep. 2007, VLDB '07: Proceedings of the 33rd International conference on Very large data bases, pp. 123-134.

Office Action from Japanese Application No. 2001-163126, dated Feb. 8, 2011.

* cited by examiner

METHOD AND APPARATUS FOR TRANSMITTING CONTENT DATA AND RECORDING AND/OR REPRODUCING APPARATUS

CROSS-REFERENCE TO RELATED APPLICATIONS

This application is a continuation of U.S. application Ser. No. 10/220,194, filed Nov. 7, 2002, which is a national stage entry under 35 U.S.C. §371 of International Application No. PCT/JP01/11589, filed Dec. 27, 2001, which claims priority from Japanese Application No. 2000-403-467, filed Dec. 28, 2000 and Japanese Application No. 2001-163126, filed May 30, 2001, the disclosures of which are hereby incorporated by reference herein.

BACKGROUND OF THE INVENTION

1. Technical Field

This invention relates to methods and apparatus for transmitting content data and a data recording and/or reproducing apparatus for preventing truant duplication of data, such as digital content.

2. Background Art

Up to now, it has been practiced to duplicate digital content, such as audio data, from a replay-only optical disc to a recordable magneto-optical disc, as the digital content remains in the state of digital signals. When connected over a dedicated cable to a reproducing device for an optical disc for duplicating digital content, the recording and/or reproducing apparatus of the magneto-optical disc updates the truant duplication inhibiting information, enabling the digital content to be duplicated only once, to recording inhibition, to supervise the copyright. Thus, the digital content, duplicated from an optical disc on a magneto-optical disc, cannot further be duplicated to the magneto-optical disc.

The digital content are exchanged between terminal devices, such as personal computers, over a network, such as Internet or LAN. In this case, the transmitting side terminal device uploads the digital content, along with an address of the receiving side terminal device, to a server device, while the receiving side terminal device downloads the digital content, addressed to itself, from the server device in which it is stored. In such exchange of digital content, interposed by the network, it is a frequent occurrence that the number of times of duplication of the digital content is not at all supervised.

The above-described system which exchanges digital content with the interposition of the network employs a general-purpose computer, without employing a dedicated recording and/or reproducing apparatus for a magneto-optical disc as in the case of a system designed for duplicating digital content from a replay-only optical disc to a recordable magneto-optical disc. It is therefore difficult to add the truant duplication preventative information to the digital content to be duplicated and to update the truant duplication preventative information on duplication to perform copyright management.

SUMMARY OF THE INVENTION

It is therefore an object of the present invention to provide methods and apparatus for transmitting content data and a data recording and/or reproducing apparatus whereby copyright management such as prohibition of truant data duplication can be achieved even in cases wherein digital content is exchanged indirectly with the interposition of a server device in a network, without employing a recording medium as an entity, or directly between different devices over a wired route or over a radio path.

The present invention provides a data communication device including a storage unit for storage of encrypted data, an authentication unit for authenticating a device which is to be the destination of transmission, and a re-encryption unit for decoding the data read out from the storage unit and for re-encrypting the decoded data, wherein, when the device which is to be the destination of transmission has been authenticated by the authentication unit, the data read out from the storage unit is decoded, and wherein the so decoded data is re-encrypted using innate key data acquired from the device which is to be the destination of transmission as authenticated by the authentication device. The so re-encrypted data is output to the device which is to be the destination of transmission.

The data communication device according to the present invention further includes a decision unit for determining, based on the results of authentication from the authentication unit, whether or not the data read out from the storage unit is to be sent to the re-encryption unit.

The data communication device of the present invention further includes an outputting unit supplied with output data from the re-encryption unit, wherein, if the device which is to be the destination of transmission has been authenticated by the authentication unit to be a device to which data is directly transmitted from the transmission device, the data read out from the storage unit is sent to the output unit.

The data transmission device of the present invention further includes a decoding unit for decoding data read out from the storage unit and a converter for converting an output signal of the decoding unit into analog signals. The decision unit sends the data read out from the storage unit to the decoding unit if the device which is to be the destination of transmission has not been authenticated by the authentication unit.

The present invention also provides a data transmitting method including authenticating a device which is to be the destination of transmission, decoding encrypted data read out from a storage unit if the device which is to be the destination of transmission has been authenticated, re-encrypting the decoded data based on innate key data acquired from the device which is to be the destination of transmission and sending the re-encrypted data to the device which is to be the destination of transmission.

The present invention also provides a data outputting method including authenticating a device which is to be the outputting destination, checking whether or not the device which is to be the outputting destination has been authenticated, and selecting outputting of encrypted data read out from the storage unit based on the results of authentication.

The present invention also provides a recording method wherein data encrypted based on innate key data of a device which is to be the destination of transmission is input, data relevant to conditions of duplication are extracted from the decoded data when the input data has been decoded, and the operation of storing the decoded data in a recording unit is controlled based on the extracted data relevant to conditions of duplication.

The present invention also provides a recording device including a decoding unit supplied with encrypted data based on innate key data of a device which is to be the destination of transmission, an extraction unit for extracting data relevant to the conditions of duplication from output data from the decoding unit, a recording unit in which decoded data is recorded and a controller supplied with the decoded results from the decoder and with the data relevant to conditions of duplication, extracted by the extraction unit. The controller controls the operation of storage in a recording unit of the decoded data, based on the data relevant to conditions of duplication as extracted by the extraction unit.

The recording device according to the present invention further includes an encryption unit between the decoding unit and the recording unit. To this encryption unit is supplied output data from the decoding unit.

The present invention also includes a method for generating encoded data including encrypting content data of input digital data based on first key data, encrypting the first key data based on second key data generated using device-specific key data to generate encrypting key data and generating encrypted data comprised at least of the encrypted content data and the key data.

The present invention also includes a method for decoding encrypted data including generating second key data by device-specific key data and common key data read out from encrypted data comprised of a random number supplied to a device, the common key data, encrypted key data and encrypted content data, decoding the encrypted key data based on the second key data generated and the random number to generate first key data, and decoding the encrypted content data based on the first key data generated.

The present invention also includes a recording and/or reproducing device including an encryption unit for encrypting supplied data, a storage unit in which the data encrypted by the encryption unit is stored, an authentication unit for authenticating a device which is to be the destination of transmission, a replay processing unit for replay processing data read out from the storage unit and a re-encryption unit for decoding output data from the replay processing unit for re-encrypting the decoded data. If the device which is to be the destination of transmission has been authenticated by the authentication unit, the data read out from the storage unit is decoded by the re-encryption unit. The decoded data is re-encrypted using innate key data acquired from the device which is to be the destination of transmission and which has been authenticated by the authentication unit. The re-encrypted data is output to the device which is to be the destination of transmission.

Other objects, features and advantages of the present invention will become more apparent from reading the embodiments of the present invention as shown in the drawings.

DETAILED DESCRIPTION

Figure 1:
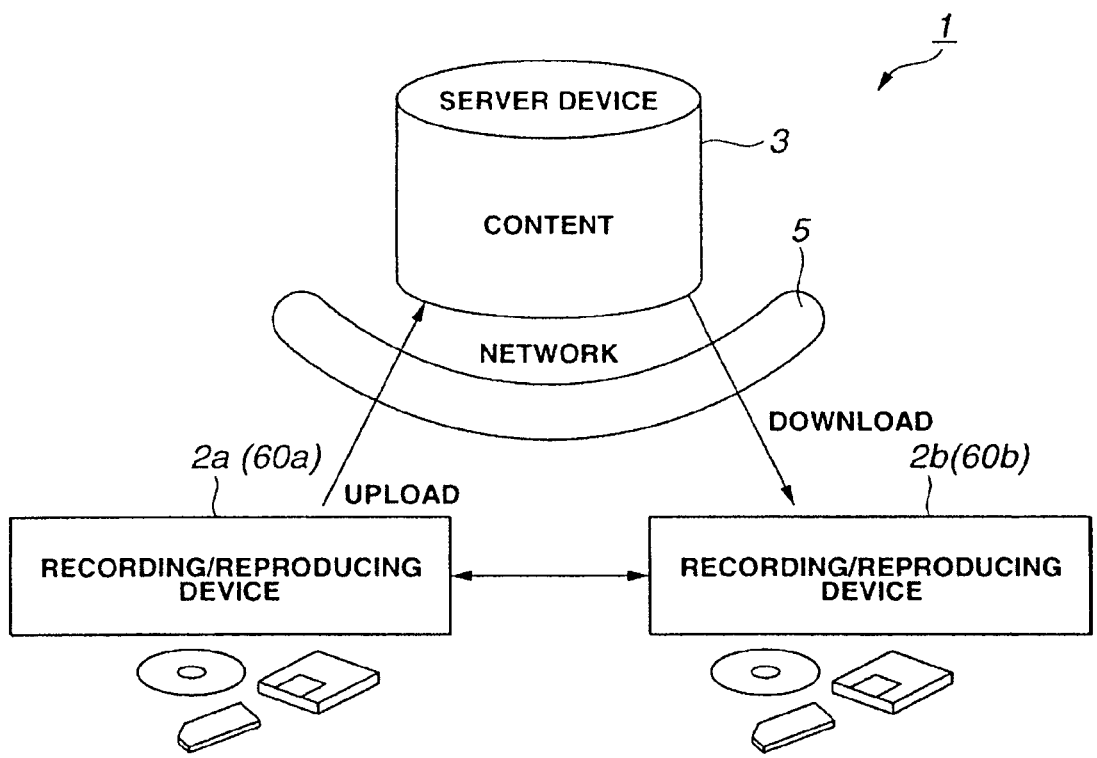
FIG. 1 illustrates a data transmission/reception system embodying the present invention.

Best Mode for Carrying Out the Invention

Referring to the drawings, a data transmission/receipt system 1 embodying the present invention is hereinafter explained.

Referring to FIG. 1, third data transmission/receipt system 1 includes recording and/or reproducing devices 2a, 2b for recording and/or reproducing digital data, such as audio data, and a server device 3 in a network 5 over which the recording and/or reproducing devices 2a, 2b are interconnected via an electrical communication network.

The server device 3 transiently stores digital data, such as audio data, uploaded from one of the recording and/or reproducing devices 2a, in a storage unit, such as a hard disc, and sends, on receipt of a downloading request from the other recording and/or reproducing device 2b the audio data stored in the storage unit to the other recording and/or reproducing device 2b.

The recording and/or reproducing device 2a and the recording and/or reproducing device 2b are able to transmit/receive data directly, without the interposition of the server device 3, by providing a dedicated cable between the two devices, using an interface conforming to for example the IEEE (The Institute of Electronics Engineer, Inc.) 1394 standard.

Figure 2:
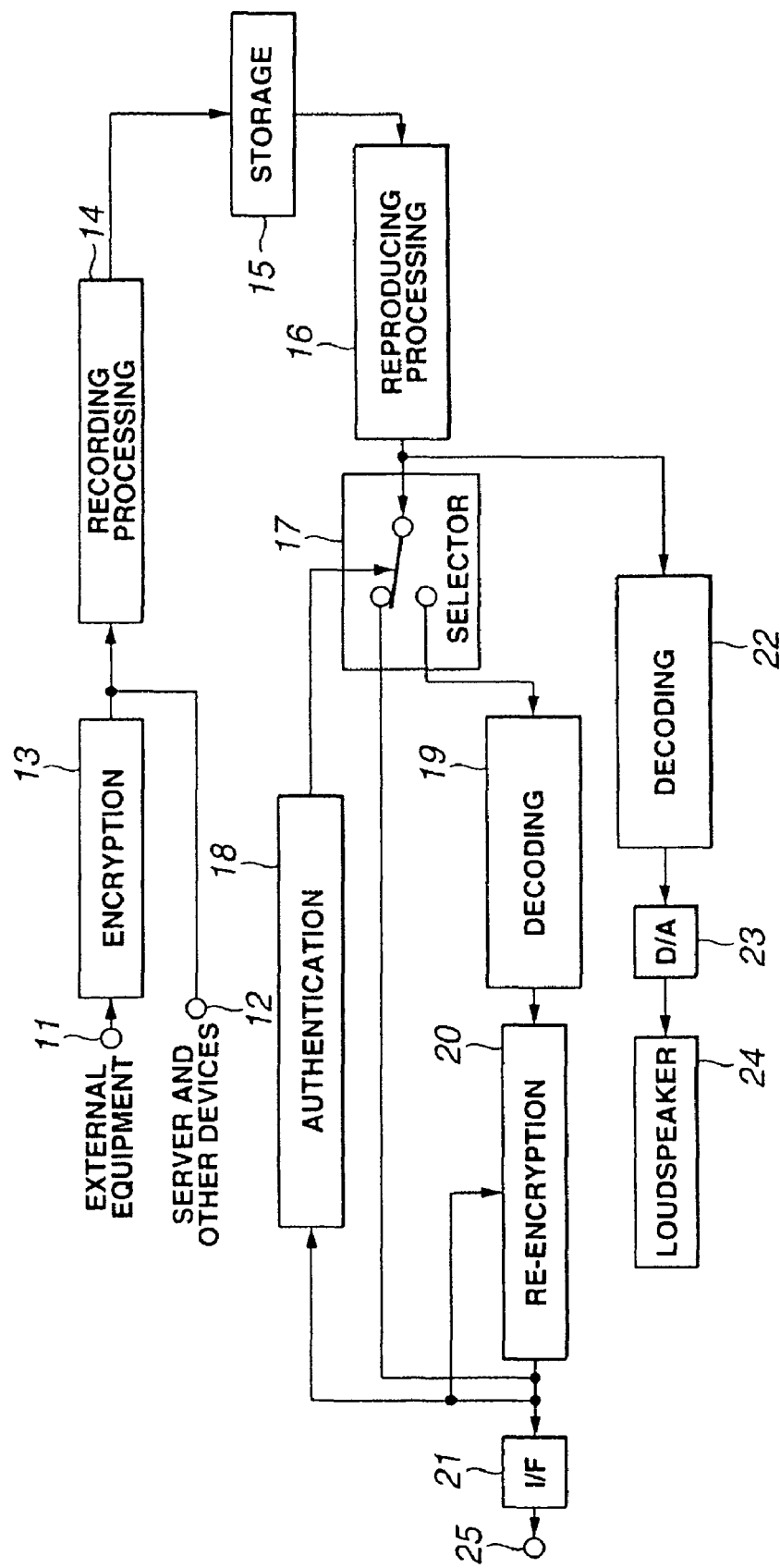
FIG. 2 is a block diagram of a recording and/or reproducing apparatus employing the system shown in FIG. 1.

Referring to FIG. 2, the recording and/or reproducing devices 2a, 2b are now explained. It is noted that, since the recording and/or reproducing devices 2a, 2b are of the same structure, the recording and/or reproducing device 2a or 2b is sometimes referred to below simply as the recording and/or reproducing device 2.

This recording and/or reproducing device 2 includes an input terminal 11, to which digital data, such as audio data, output from an external equipment, is input, and an input terminal 12, to which encrypted digital data from the other recording and/or reproducing device 2 is input from the server device 3 over the network 5. The recording and/or reproducing device 2 includes an encryption circuit 13 for encrypting digital data input from an input terminal 11, a recording processing circuit 14 for recording the encrypted digital data, a storage unit 15, comprised for example of a hard disc on which encrypted digital data is recorded, a recordable optical disc, a semiconductor memory, or an IC card, and a reproducing processing circuit 16 for reproducing digital data read out from reproducing means, such as magnetic head or an optical pickup.

This recording and/or reproducing device 2 includes, as a transmission system for transmitting digital data to the server device 3 or to another recording and/or reproducing device, a selector 17 for switching between a route of directly outputting the encrypted digital data and a route of re-encrypting the encrypted digital data to output the re-encrypted data, an authentication circuit 18 for authenticating a destination of transmission of digital data and for controlling the selector 17 based on the results of authentication, a decoding circuit 19 for decrypting the encrypted digital data, a re-encrypting circuit 20 for re-encrypting the digital data decrypted by the decoding circuit 19 and a communication interface (communication I/F) 21 for data communication with the server device 3 and with the other recording and/or reproducing device 2.

Moreover, the recording and/or reproducing device 2 also includes, as a reproducing system for digital data recorded on the storage unit 15, a decoding circuit 22, to which is input an output of the reproducing processing circuit 16, a D/A converter 23, for converting the decoded digital data into analog signals, and a loudspeaker 24 for converting the converted analog signals into electrical signals to output the resulting electrical signals.

Figure 3:
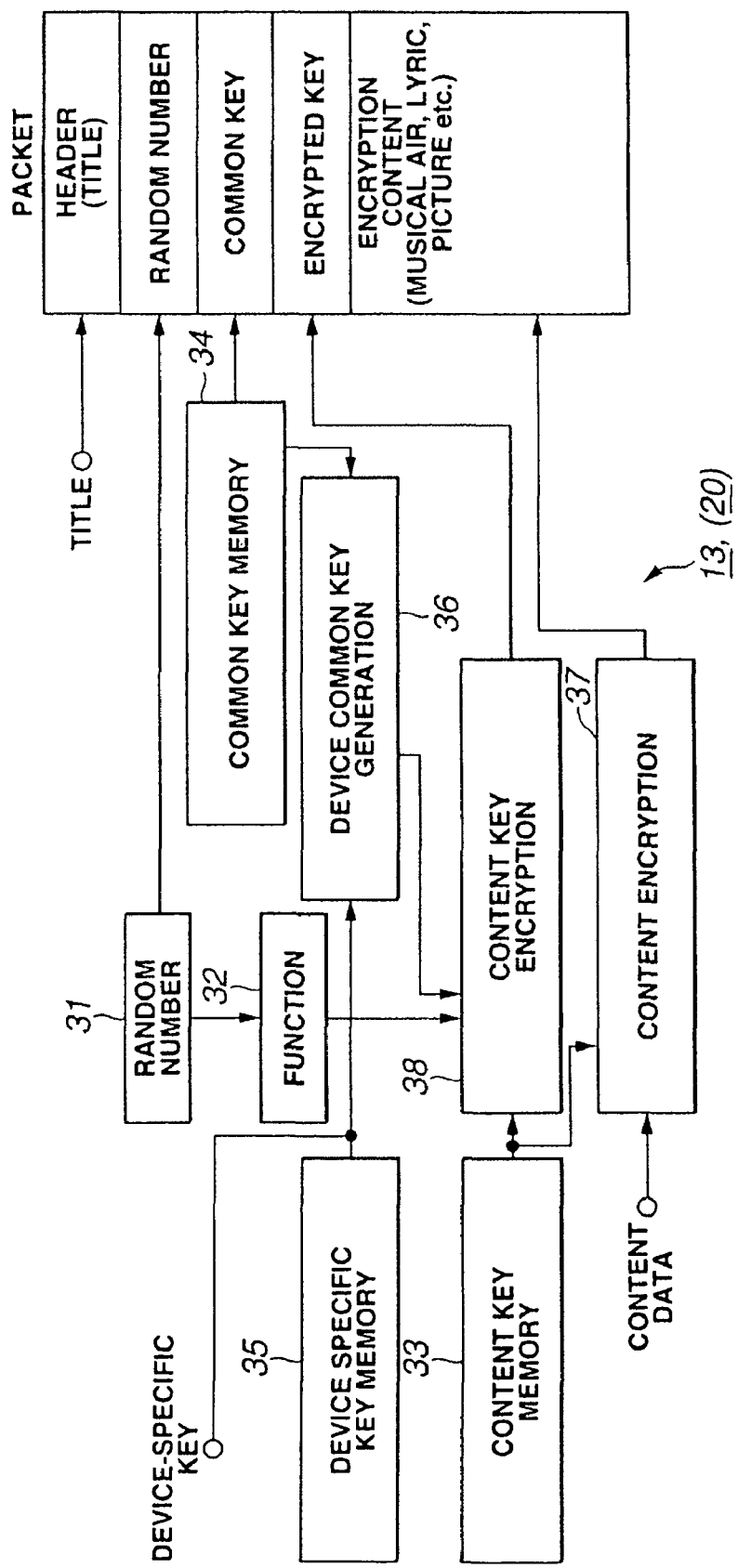
FIG. 3 is a block diagram of an encryption circuit for encrypting digital data.

The encryption circuit 13 encrypts the digital data, input from the input terminal 11, using a device specific key stored in a memory which will be explained subsequently. Specifically, the encryption circuit 13 includes, as shown in FIG. 3, a random number generating circuit 31 for generating random numbers, a function circuit 32 for generating a function which is based on a random number, a content key memory 33 for storing the content key for encrypting the content, a memory for a common key 34 for storing the content key, a memory for a device-specific key 35, for recording a device-specific key proper to the recording and/or reproducing device 2, a device-common key generating circuit 36 for generating a device-common key, common to the totality of the recording and/or reproducing devices 2, from the common key and the device-specific key, a content encrypting circuit 37 for encrypting the content with the content key, and a content key encrypting circuit 38 for encrypting the content key with the device-common key and with a function which is given the random number.

When the digital data, input from the input terminal 11, is input to the encryption circuit 13, the content encrypting circuit 37 reads out the preset content key from the content key memory 33 and, using this content key, encrypts the content, except the header, such as title, to output the encrypted content. Simultaneously, the random number generating circuit 31 generates a random number to output this random number to the function circuit 32, which function circuit 32 then generates a function based on this random number. The device-common key generating circuit 36 reads out the common key and the device-specific key from the memory for a common key 34 and from the memory for a device-specific key 35, respectively, and generates the device common key based on the common key read out from the memory for a common key 34 and the device-specific key read out from the memory for a device-specific key 35. The content key used for encrypting the content read out from the content key memory 33 is also output to the content key encrypting circuit 38. This content key encrypting circuit 38 generates an encrypting key with the function generated by the function circuit 32 and with the device common key generated by the device-common key generating circuit 36.

The encryption circuit 13 generates the following packets. That is, the packet generated by this encryption circuit 13 is made up by a header, such as a title of content, not encrypted, a random number generated by the random number generating circuit 31, the common key output by the memory for a common key 34, an encryption key output by the content key encrypting circuit 38, and encrypted content data output by the content encrypting circuit 37.

The encryption circuit 13 outputs data to the recording processing circuit 14, in terms of a packet as a unit, in order to perform the processing for recording in the storage unit 15. To the recording processing circuit 14 are input packet-based digital data, encrypted by the encryption circuit 13, and encrypted digital data from the server device 3 and other recording and/or reproducing device 2. These encrypted digital data are those input at the input terminal 12. This recording processing circuit 14 applies error correction processing or modulation to these input data followed by binary encoding. The data recorded by the recording processing circuit 14 is recorded on a recording medium of the storage unit 15 by a magnetic head forming the storage unit 15 or by a head unit of for example the optical pickup. Meanwhile, the storage unit 15 may be enclosed in the main body unit of the device or may be mounted on or dismounted from the main body unit of the device.

The data stored in the storage unit 15 is also read out from the magnetic head or by a head unit of for example the optical pickup. The so read out data is output to the reproducing processing unit 16. The reproducing processing circuit 16 binary encodes an output signal from the above-mentioned head unit and processes the binary encoded data with demodulation or with error correction processing to output the resulting signals to the communication I/F 21 of the transmission system or to the decoding circuit 22.

The authentication circuit 18 effectuates authentication processing with the recording and/or reproducing device as the source of transmission, that is one of the aforementioned recording and/or reproducing devices 2a and 2b, to control the switching of the selector 17 based on the results of authentication. Even if authentication has been obtained with the recording and/or reproducing device 2 as the source of transmission, the authentication circuit 18 performs switching control of the selector 17 as to whether the digital data is to be transmitted through the server device 3 to the other recording and/or reproducing device as the destination of transmission or directly to the recording and/or reproducing device as the destination of transmission over a dedicated cable. When the authentication with the recording and/or reproducing device as the destination of transmission has not been obtained by the authentication circuit 18 or when the authentication has been obtained and digital data is directly output to the other recording and/or reproducing device, the selector 17 is set so as to output the digital data in its encrypted form. On the other hand, when the authentication has been obtained and the digital data is output through the server device 3 to the other recording and/or reproducing device as the destination of transmission, the selector is set for re-encryption.

Figure 4:
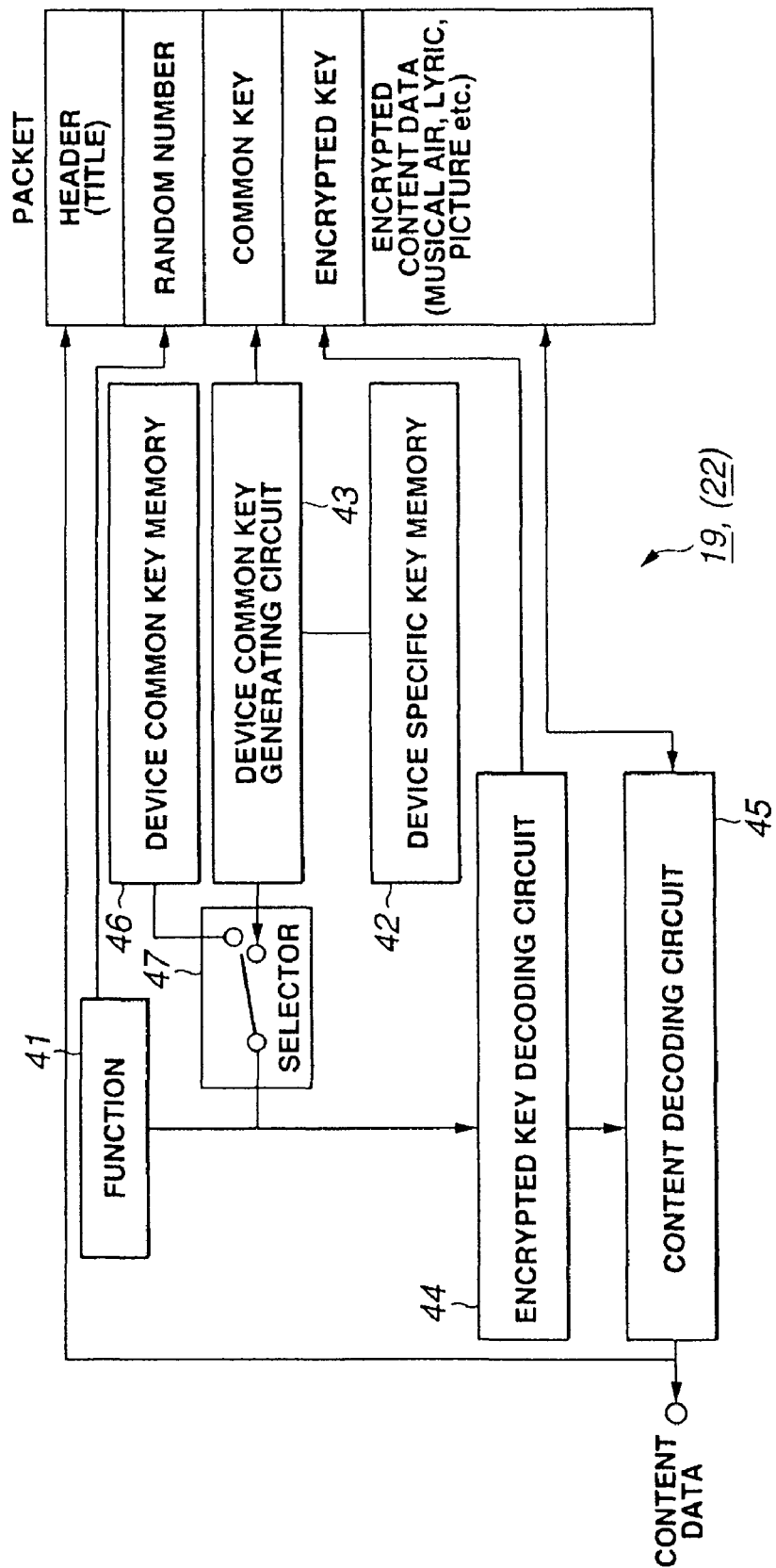
FIG. 4 is a block diagram of a decrypting circuit.

When transmitting the digital data, the decoding circuit 19, forming the transmission system, decodes the digital data, encrypted by the above-mentioned encryption circuit 13, to output the decoded digital data to the re-encrypting circuit 20 for re-encryption with the device-specific key of the recording and/or reproducing device as the destination of transmission, acquired from the destination of transmission. Specifically, the decoding circuit 19 includes a function circuit 41 adapted for generating a function based on a random number in the packet, a memory for the device-specific key 42, in which the same key as that stored in the memory for a device-specific key 35 of the encryption circuit 13 is stored, and a device-common key generating circuit 43 for generating a device-common key from the common key in the packet and the device-specific key read out from the memory for the device-specific key 42, as shown in FIG. 4. The decoding circuit 19 also includes an encryption key decoding circuit 44 for decoding the encryption key in the packet with the function generated in the function circuit 41 and with the device common key generated in the device-common key generating circuit 43, and a content decoding circuit 45 adapted for decoding the encrypted content data in the packet based on the content key decoded by the encryption key decoding circuit 44, as shown in FIG. 4. When the encrypted digital data is input to the decoding circuit 19, the function circuit 41 generates a function based on the random number in the packet of the input digital data. The device-common key generating circuit 43 reads out the common key in the packet and the device-specific key from the memory for the device-specific key 42 to generate a device common key in the device-common key generating circuit 43 to output the so produced device common key to the encryption key decoding circuit 44. The encryption key decoding circuit 44 decodes the encrypting key, read out from the packet, by the function generated in the function circuit 41 and by the device common key sent from the device-common key generating circuit 43, to generate a content key, which then is output to the content decoding circuit 45. The content decoding circuit 45 reads out the encrypted content data from the packet and decodes the encrypted content data using the content key supplied from the decoding circuit 44. Meanwhile, since the header in the packet is not encrypted, the decoding circuit 19 directly reads out the header from the packet. The decoding circuit 19 re-encrypts the decoded digital data to output the data to the re-encrypting circuit 20.

When the authentication has been acquired and the re-encrypting circuit 20 outputs the digital data to another recording and/or reproducing device as the destination of transmission, the re-encrypting circuit acquires the device-specific key from the recording and/or reproducing device as the destination of transmission. Using this acquired device-specific key, the re-encrypting circuit re-encrypts the output digital data, that is, re-encrypts the digital data sent from the decoding circuit 19. This re-encrypting circuit 20 is substantially of the same structure as the encryption circuit 13 shown in FIG. 3 and hence is not explained specifically. To the device-common key generating circuit 36 is input the device-specific key of the destination of transmission, read out not from the memory for a device-specific key 35 but from the memory for device-specific key of the other recording and/or reproducing device as the destination of transmission of the digital data. The re-encrypting circuit 20 generates packets, as described above, to output the data to the communication I/F 21 from one packet to the next. The packet is made up by a non-encrypted header, a random number generated in the random number generating circuit 31, a common key output from the memory for a common key 34, an encrypting key output from the content key encrypting circuit 38 and the encrypted content output from the content encrypting circuit 37.

For transmission to, for example, the server device 3, the communication I/F 21 executes a transmission protocol, such as TCP/IP (transmission control protocol/internet protocol), to transmit the re-encrypted digital data to the server device 3 via output terminal 25. In directly communicating with other recording and/or reproducing devices, as the destination of transmission over a dedicated cable, the communication I/F executes e.g., IEEE 1394 protocol, to make transmission to the recording and/or reproducing devices, as the destination of transmission, via output terminal 25.

The decoding circuit 22, forming the reproducing system, is supplied with digital data, which are read out from the storage unit 15 and demodulated and encrypted by the reproducing processing circuit 16, to decrypt the digital data encrypted by the encryption circuit 13. Basically, this decoding circuit 22 is configured similarly to the decoding circuit 19, as shown in FIG. 4, and, although not shown in detail, includes a memory for a device-common key 46, and a selector 47 for switching between an output of the device common key generating circuit 43 and an output of the memory for a device-common key 46.

The selector 47 is switched by a controller, not shown, of the recording and/or reproducing device 2. In reproducing the digital data, downloaded from the server device 3, the selector 47 is switched so that the device-common key, generated by the device-common key generating circuit 43, will be output to the encryption key decoding circuit 44. In reproducing the digital data, directly transmitted from the other recording and/or reproducing device over the dedicated cable, the selector 47 is switched so that the device common key stored in the memory for a device-common key 46, will be output to the encryption key decoding circuit 44. The decoding circuit 22 outputs the decoded digital data to the D/A converter 23. The D/A converter 23 converts the decoded digital data into analog signals. These analog signals are sent to the loudspeaker 24, which then transduces the supplied analog signals into audible output signals.

In the above-described recording and/or reproducing device 2, the operation of storing digital data, such as audio data, output from the external equipment, in the storage unit 15, is now explained. The digital data, read out from the external storage device, is input from the input terminal 11, so as to be encrypted by the encryption circuit 13. That is, when the digital data is input to the encryption circuit 13 from the input terminal 11, the content encrypting circuit 37 encrypts the input digital data, to the exclusion of the header part, such as title, using the content key read out from the content key memory 33. At this time, the random number generating circuit 31 generates a random number to output this random number to the function circuit 32, which function circuit 32 then generates a function based on the random number supplied from the random number generating circuit 31. The device-common key generating circuit 36 generates a device common key based on the common key read out from the memory for a common key 34 and on the device innate key generated by the memory for a device-specific key 35. The content key, used in encrypting the content data of the digital data, is also output from content key memory 33 to the content key encrypting circuit 38. This content key encrypting circuit 38 generates an encrypting key from the function generated by the function circuit 32 based on the random number supplied thereto and on the device common key generated by the device-common key generating circuit 36. The encryption circuit 13 generates a packet made up of the non-encrypted header, the random number generated by the random number generating circuit 31, the common key output by the memory for a common key 34, the encrypting key output by the content key encrypting circuit 38 and the encrypted content output by the content encrypting circuit 37.

The encrypted data, output on the packet basis from the encryption circuit 13, is processed for recording in the recording processing circuit 14 so as to be then recorded on the recording medium by the header unit forming the storage unit 15. In the recording and/or reproducing device 2, the digital data is recorded as it is encrypted in the storage unit 15, although the header is not encrypted. Thus, the recording and/or reproducing device 2 is able to retrieve the digital data, as desired by the user, extremely readily, with use of the header, even though the digital data is stored as it is encrypted in the storage unit 15, so that the digital data transmitted or the digital data reproduced may be found out extremely readily.

Figure 5:
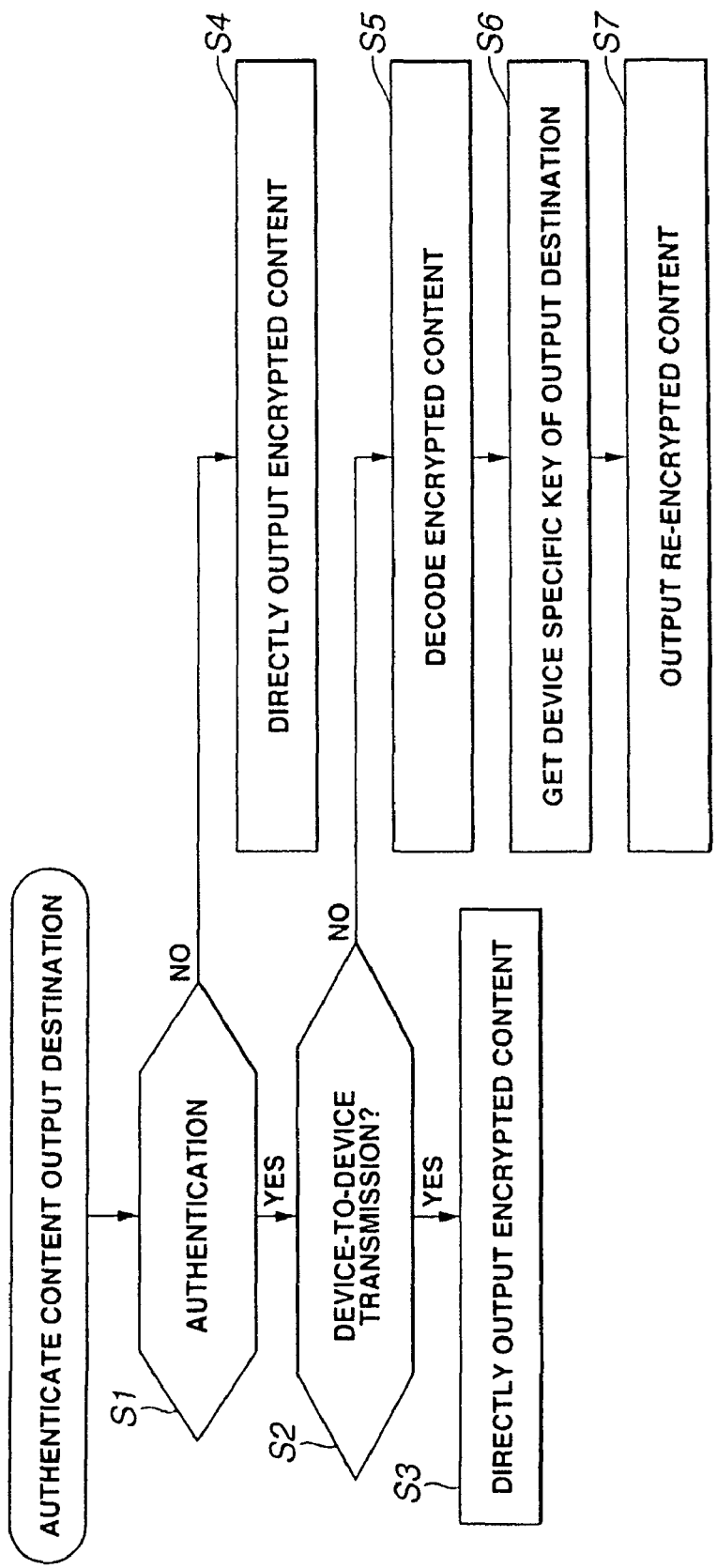
FIG. 5 is a flowchart for illustrating the authentication processing by a recording and/or reproducing apparatus.

Referring to FIG. 5, the authentication processing in the authentication circuit 18 when the recording and/or reproducing device 2a as the source of transmission, described above, is transmitted to the recording and/or reproducing device 2b, as the destination of transmission, is now explained.

First, when the transmission processing of transmitting digital data, stored in the encrypted in the storage unit 15 is executed at step S1 by the user, the authentication circuit 18 of the recording and/or reproducing device 2a as the source of transmission performs authentication as to whether or not the recording and/or reproducing device 2b as the destination of transmission is a device conforming to the same standard. Specifically, the recording and/or reproducing device 2a performs authentication of the recording and/or reproducing device 2b of the destination of transmission over a dedicated cable or through the server device 3. If the recording and/or reproducing device 2b as the destination of transmission has been authenticated, that is if the recording and/or reproducing device 2b as the destination of transmission is a device conforming to the same standard, the recording and/or reproducing device 2a as the source of transmission proceeds to step S2. If otherwise, that is if the recording and/or reproducing device as the destination of transmission is found to be not the device conforming to the same standard, the recording and/or reproducing device as the source of transmission proceeds to step S4.

At step S2, the recording and/or reproducing device 2a as the source of transmission checks to see whether the transmission of digital data is direct transmission over a dedicated cable or indirect transmission over the server device 3, and selects the method for transmitting the digital data for transmission and the system of the communication I/F 21. If it is determined at step S2 that the transmission is direct transmission over the dedicated cable, the recording and/or reproducing device 2a as the source of transmission proceeds to step S3 and, if it is determined at step S2 that the transmission is indirect transmission through the server device 3, the recording and/or reproducing device 2a proceeds to step S5.

If, at step S3, the transmission is direct transmission employing a dedicated cable, the recording and/or reproducing device 2b as the destination of transmission is the authenticated regular device having the decoding function in meeting with own encryption, and hence the recording and/or reproducing device 2a as the source of transmission directly outputs the encrypted digital data over the dedicated cable to the recording and/or reproducing device 2b as the destination of transmission. That is, the selector 17 of the recording and/or reproducing device 2a interconnects the reproducing processing circuit 16 and the communication I/F 21, as shown in FIG. 2. Thus, the encrypted digital data, stored in the storage unit 15, is processed for replay in the reproducing processing circuit 16 and thence output directly from the communication I/F 21 to the recording and/or reproducing device 2b as the destination of transmission. Since it is unnecessary to perform decoding or re-encryption, the recording and/or reproducing device 2a as the source of transmission is able to send the digital data speedily to the recording and/or reproducing device 2 as the destination of transmission.

To the recording and/or reproducing device 2b as the destination of transmission, encrypted digital data is input from the recording and/or reproducing device 2a as the source of transmission are input at the input terminal 12 and processed for recording in the recording processing circuit 14 so as to be then recorded on the storage unit 15. In the recording and/or reproducing device 2b as the destination of transmission, the encrypted digital data is stored in the storage unit 15, however, since the header is not encrypted, the digital data to be reproduced can be retrieved readily. In reproducing the encrypted digital data, recorded in the storage unit 15, the encrypted digital data, read out from the reproducing means, is processed for reproduction by the reproducing processing circuit 16 so as to be output to the decoding circuit 22 of the reproducing system.

Referring to FIG. 4, the decoding circuit 22 switches the selector 47 to enable the device common key stored in the memory for a device-common key 46 to be output to the encryption key decoding circuit 44. When the digital data encrypted in the encryption circuit 13 of the recording and/or reproducing device 2a as the source of transmission is input to the function circuit 41, the function circuit generates a function based on the random number in the packet. The encryption key decoding circuit 44 reads out the device common key stored in the memory for a device-common key 46. The encryption key decoding circuit 44 decodes the encrypting key, read out from the packet, with the function generated in the function circuit 41 and with the device common key, to generate the content key, which is output to the content decoding circuit 45. The content decoding circuit 45 reads out the encrypted content from the packet to decode the read-out encrypted content using the content key. Meanwhile, since the header in the packet is not encrypted, the decoding circuit 22 directly reads it out from the packet. The decoding circuit 22 outputs the decoded digital data to the D/A converter 23, which D/A converter 23 converts the decoded digital data into analog signals. These analog signals are supplied to the loudspeaker 24, which loudspeaker 24 transduces the analog signals to output audible sound.

If, at step S1, the recording and/or reproducing device 2b as the destination of transmission has not been authenticated, the recording and/or reproducing device 2a as the source of transmission at step S4 directly outputs the encrypted digital data over the dedicated cable or through the server device 3 to the recording and/or reproducing device 2b as the destination of transmission. That is, the recording and/or reproducing device 2a as the source of transmission changes over the selector 17 so that the reproducing processing circuit 16 will be directly connected to the communication I/F 21, as shown in FIG. 2. Thus, the encrypted digital data, stored in the storage unit 15, is processed for replay in the reproducing processing circuit 16 and thence output directly through the communication I/F 21 to the recording and/or reproducing device 2b as the destination of transmission. The encrypted digital data is input to the input terminal 12 of the recording and/or reproducing device 2b as the destination of transmission and processed for recording by the recording processing circuit 14 so as to be recorded by recording means in the storage unit 15.

It should be noted that the recording and/or reproducing device 2b as the destination of transmission has not been authenticated and does not have the decoding function so that it cannot decode the encrypted digital data stored in the storage unit 15. Thus, even supposing that the digital data has been acquired by a person other than an authorized user, the digital data can be prevented from being reproduced.

If the recording and/or reproducing device 2a as the source of transmission at step S2 has determined that the transmission is indirect transmission through the server device 3, the encrypted digital data, read out from the storage unit 15, is processed for reproduction by the reproducing processing circuit 16. The selector 17 is changed over to interconnect the reproducing processing circuit 16 and the decoding circuit 19 to permit re-encryption.

Referring to FIG. 4, when the encrypted digital data is input to the decoding circuit 19, the function circuit 41 generates a function, based on the random number in the packet. The device-common key generating circuit 43 reads out the common key in the packet and the device-specific key from the memory for the device-specific key 42 to generate the device common key which is output to the encryption key decoding circuit 44. The encryption key decoding circuit 44 decodes the encrypting key read out from the packet, by the function generated in the function circuit 41 and by the device common key, to generate a content key, which is output to the content decoding circuit 45. The content decoding circuit 45 reads out the encrypted content from the packet and decodes it using the content key. Meanwhile, since the header in the packet is not encrypted, the decoding circuit 19 directly reads it out from the packet. The decoding circuit 19 outputs the decoded digital data to the re-encrypting circuit 20.

Then, at step S6, the recording and/or reproducing device 2a as the source of transmission acquires the device-specific key through the server device 3 from the memory for the device-specific key 35 of the recording and/or reproducing device 2b, as the destination of transmission, in order to permit decoding by the authenticated recording and/or reproducing device 2b as the destination of transmission.

Then, at step S7, the digital data decoded by the decoding circuit 19 is re-encrypted in the re-encrypting circuit 20 in the recording and/or reproducing device 2a, as the source of transmission, using a device-specific key acquired at step S6. That is, when the digital data is input to the re-encrypting circuit 20, the content encrypting circuit 37 reads out the preset content key from the content key memory 33 and encrypts the digital data, except the header, such as title, using the so read-out content key. Simultaneously, the random number generating circuit 31 generates a random number, which is then output to the function circuit 32. The function circuit 32 generates a function, based on the random number. The device-common key generating circuit 36 generates a device common key, based on the common key read out from the memory for a common key 34, and on the device-specific key, acquired from the recording and/or reproducing device 2b as the destination of transmission. The content key, used for encrypting the content, is also output from the content key memory 33 to the content key encrypting circuit 38, which content key encrypting circuit 38 then generates an encrypting key, using the function generated by the function circuit 32 by being afforded with the random number and also using the device common key generated in the device-common key generating circuit 36. The re-encrypting circuit 20 generates a packet made up of an unencrypted header, the random number generated in the random number generating circuit 31, the common key output from the memory for a common key 34, the encrypting key output from the content key encrypting circuit 38, and encrypted content output from the content encrypting circuit 37, to output the resulting packet to the communication I/F 21. The so re-encrypted digital data is transmitted over the network 5 to the server device 3 where it is stored transiently. If, in this case, an unauthorized terminal device accesses the server device 3, and the digital data transmitted from the recording and/or reproducing device 2a is downloaded and stored in the storage unit of the terminal device, this terminal device is unable to decode the digital data and hence is unable to reproduce the digital data downloaded to the storage unit. Thus, the digital data transiently recorded in the server device 3 can be prevented from being reproduced by the terminal device of the unauthorized user. When a number of encrypted digital data is saved in the server device 3, the header is not encrypted, so that the data saved in the server device 3 can be easily retrieved by the recording and/or reproducing devices 2a, 2b.

By accessing the server device 3, the recording and/or reproducing device 2b as the destination of transmission is able to download the digital data transmitted to itself and saved in the server device 3. The encrypted digital data, downloaded from the server device 3, is input at the input terminal 12 and processed for recording in the recording processing circuit 14 so as to be then stored in the storage unit 15. Although the encrypted digital data is stored in the storage unit 15 of the recording and/or reproducing device 2b as the destination of transmission, the digital data to be reproduced can be easily retrieved because the header is not encrypted. In replay, the digital data read out from the storage unit 15 is processed for replay in the reproducing processing circuit 16 and output to the decoding circuit 22 of the reproducing system.

Referring to FIG. 4, the selector 47 is changed over so that the device common key generated in the device-common key generating circuit 43 will be output to the encryption key decoding circuit 44. When the encrypted digital data is input to the encryption circuit 13, the function circuit 41 generates a function, based on the random number in the packet. The device-common key generating circuit 43 reads out the common key in the packet and the device-specific key from the memory for the device-specific key 42 to generate a device common key which is output to the encryption key decoding circuit 44. It should be noted that the device-specific key in the memory for the device-specific key 42 of the recording and/or reproducing device 2b is of the same type as that acquired at step S36 by the recording and/or reproducing device 2a as the source of transmission. The encryption key decoding circuit 44 decodes the encrypting key, read out from the packet, by the function generated in the function circuit 41 and by the device common key, to generate the content key, which is output to the content decoding circuit 45. The content decoding circuit 45 reads out the encrypted content data from the packet to decode the so read out encrypted content data using the content key. Meanwhile, since the header in the packet is unencrypted, it is directly read out from the packet by the decoding circuit 22. The decoding circuit 22 outputs the decoded digital data to the D/A converter 23. The D/A converter 23 converts the decoded digital data into analog signals, which are sent to the loudspeaker 24. The loudspeaker 24 transduces the analog signals into audible output sound.

In the above-described system, if the digital data transiently stored in the server device 3 is downloaded by an unauthorized recording and/or reproducing device and stored in the storage unit thereof, the downloaded digital data is encrypted and hence is not reproduced by the unauthorized recording and/or reproducing device. Thus, according to the present invention, copyright management may be made without introducing the truant duplication inhibiting information into the digital data.

Although the case of employing a dedicated cable in transmitting digital data between the recording and/or reproducing devices 2a, 2b has been explained in the foregoing, data transmission can also be made over a radio route.

Another embodiment of the present invention in which digital data is exchanged between the recording and/or reproducing device 2a as a dedicated equipment of the present system and the recording and/or reproducing device 2b is hereinafter explained. The recording and/or reproducing devices 2a, 2b, exchanging data directly over a wired or wireless route, represent a safe environment for digital data communication. So, in the present modified embodiment of the recording and/or reproducing device 2a as the source of transmission, according to the present invention, the encrypted digital data is directly transmitted to the recording and/or reproducing device 2b when the recording and/or reproducing device 2b as the destination of transmission is authenticated. When the recording and/or reproducing device 2b as the destination of transmission is not authenticated, outputting of the digital data is inhibited. In the present embodiment, digital data is not exchanged by the unauthorized device through the accessible server device 3, as in the above-described embodiment, in order to improve the safety in data communication. A further modified embodiment of the present invention is explained with reference to FIGS. 6 and 7.

Figure 6:
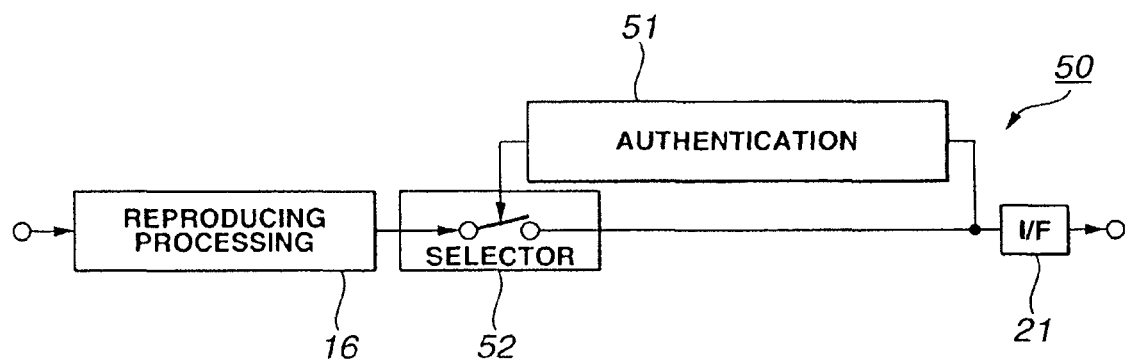
FIG. 6 is a block diagram of a recording and/or reproducing apparatus as a dedicated apparatus.

Referring to FIG. 6, the present recording and/or reproducing device 50 is configured similarly to the recording and/or reproducing device 2 shown in FIG. 2 except the transmission system. The recording and/or reproducing device 50 includes, as a transmission system for transmitting digital data to the other recording and/or reproducing device, an authentication circuit 51 for authenticating the device as the data transmission destination, and a selector 52 for enabling data to be output only when the device as the destination of transmission has been authenticated in the authentication circuit 51.

The authentication circuit 51 authenticates the device as the destination of transmission and controls the switching of the selector 52 based on the results of authentication. For example, the device as the destination of transmission and the recording and/or reproducing device 50 as the source of transmission are interconnected over a cable conforming to the IEEE 1394 standard and the device 50 authenticates the device as the destination of transmission to control the selector based on the results thereof. That is, if the device as the destination of transmission is the recording and/or reproducing device 50 as the dedicated equipment, the authentication circuit 51 assumes that the transmission of encrypted digital data is possible and switches the selector 52 for interconnecting the reproducing processing circuit 16 and the communication I/F 21. When the device as the destination of transmission is the server device 3 or e.g., a personal computer as a general-purpose equipment, but is not the recording and/or reproducing device 50, the authentication circuit 51 changes over the selector 52 so as not to interconnect the reproducing processing circuit 16 and the communication I/F 53 43, in order to prohibit the outputting of the encrypted digital data.

Figure 7:
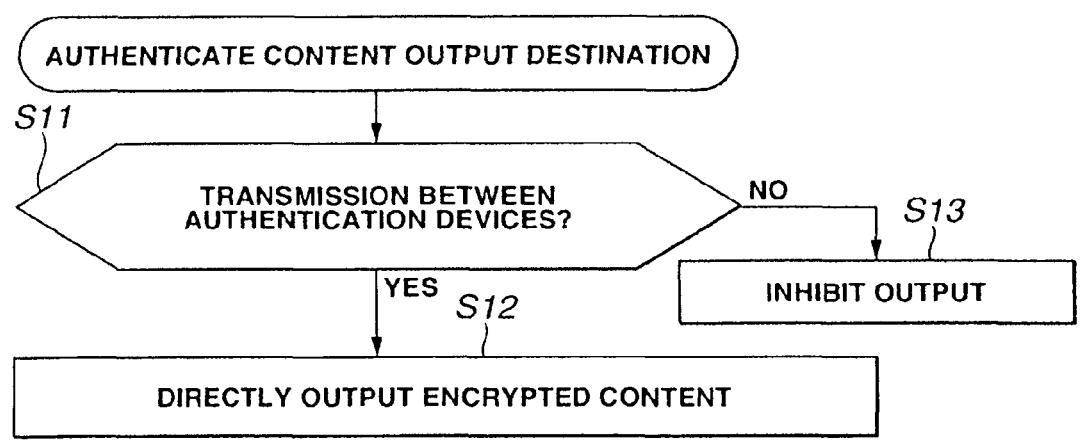
FIG. 7 is a flowchart for illustrating the sequence of operations in transmitting digital data to another device.

Referring to FIG. 7, the sequence of operations when the recording and/or reproducing device 50 transmitting digital data to the other device is explained. If, at step S11, the user performs the operation of transmitting the encrypted digital data stored in the storage unit 15, the authentication circuit 51 of the recording and/or reproducing device 50 as the source of transmission checks to see whether or not the device as the destination of transmission is the recording and/or reproducing device having the same function as the recording and/or reproducing device 50 as the source of transmission. That is, the authentication circuit 51 does not authenticate the device of the destination of transmission as being the device of the destination of transmission when the device as the destination of transmission is the general-purpose equipment such as a personal computer or when the destination of transmission is ultimately the recording and/or reproducing device 50 but transmission thereto is made via the server device 3. That is, if digital data is transmitted to the server device 3, there is a risk of illicit downloading to an unauthorized device, such that the server device 3 cannot be the to be completely safe as an environment. On the other hand, if the digital data is sent to the general-purpose equipment, such as a personal computer, there is a risk that the decoding software has been illicitly installed on the personal computer such that the risk is high that the encrypted digital data is decoded illicitly. The recording and/or reproducing device 50 is adapted to transmit digital data only when direct connection is made in the recording and/or reproducing device 50 as the dedicated equipment.

When the digital data is directly transmitted to the recording and/or reproducing device 50, the authentication circuit 51 at step S12 changes over the selector 52 to interconnect the reproducing processing circuit 16 to the communication I/F 21. The recording and/or reproducing device 50 as the source of transmission sends encrypted digital data to the recording and/or reproducing device 50 as the destination of transmission.

When the device of the destination of transmission is directly a general-purpose equipment, such as personal computer, or when the destination of transmission is the recording and/or reproducing device 50 but is directly the server device 3, the authentication circuit 51 at step S13 changes over the selector 52 to turn off the connection between the reproducing processing circuit 16 and the communication I/F 21. That is, the recording and/or reproducing device 50 inhibits the outputting of the encrypted digital data to the device of the destination of transmission.

The above-described recording and/or reproducing device 50 as the source of transmission permits the outputting of the encrypted digital data only when the digital data can be transmitted is a completely safe environment, that is when the digital data can be directly output to the recording and/or reproducing device 50 as the destination of transmission, to effectuate safe transmission/receipt of the digital data. Moreover, in transmitting the digital data, the digital data saved in the encrypted state in the storage unit 15 can be sent to the recording and/or reproducing device 50 as the destination of transmission without re-encryption, thus achieving saving in time corresponding to the re-encryption time.

In the above-described embodiment, digital data can be output only when the device of the destination of transmission is such a device that can be authenticated, for example, when the device of the destination of transmission is the recording and/or reproducing device 50 which is of the same type as the device of destination of transmission. However, the device of the destination of transmission is not limited to the recording and/or reproducing device 50 if the device of the destination of transmission enables digital data to be output under a safe environment. For example, if the device in which e.g., the decoding circuit conforming to the present invention is formed by a dedicated semiconductor chip, the device is reliable and permits data to be exchanged safely, and hence the outputting of digital data may be allowed in such case.

Figure 8:
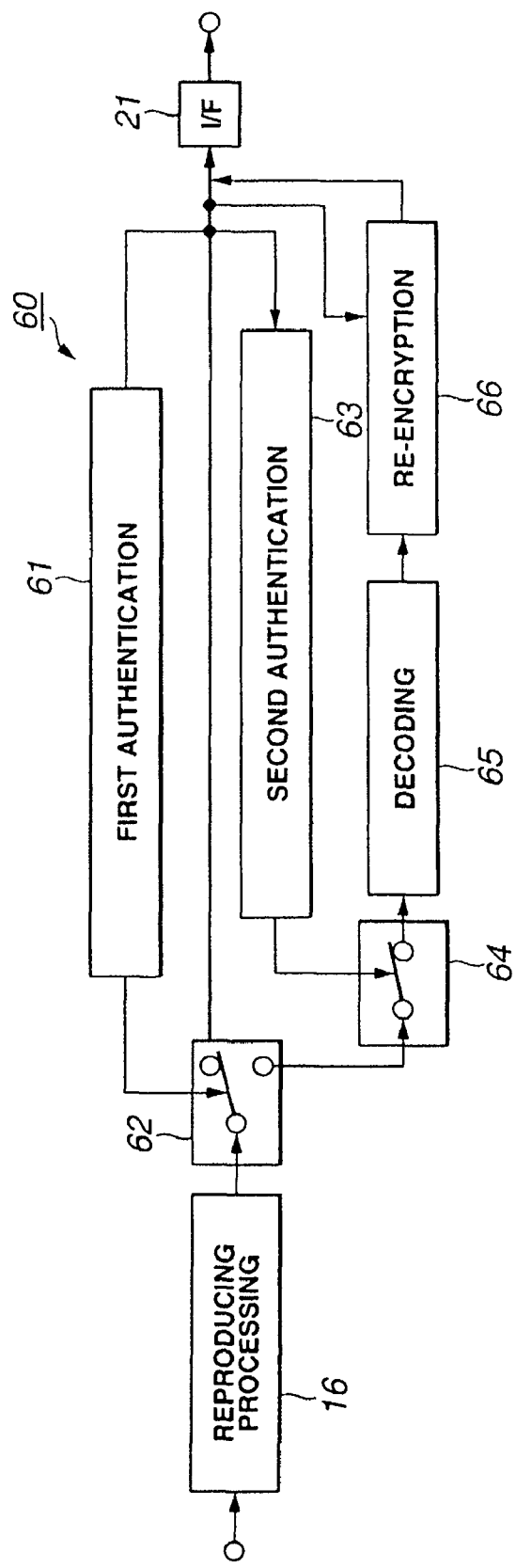
FIG. 8 is a block diagram showing a recording and/or reproducing apparatus as a dedicated device.
Figure 9:
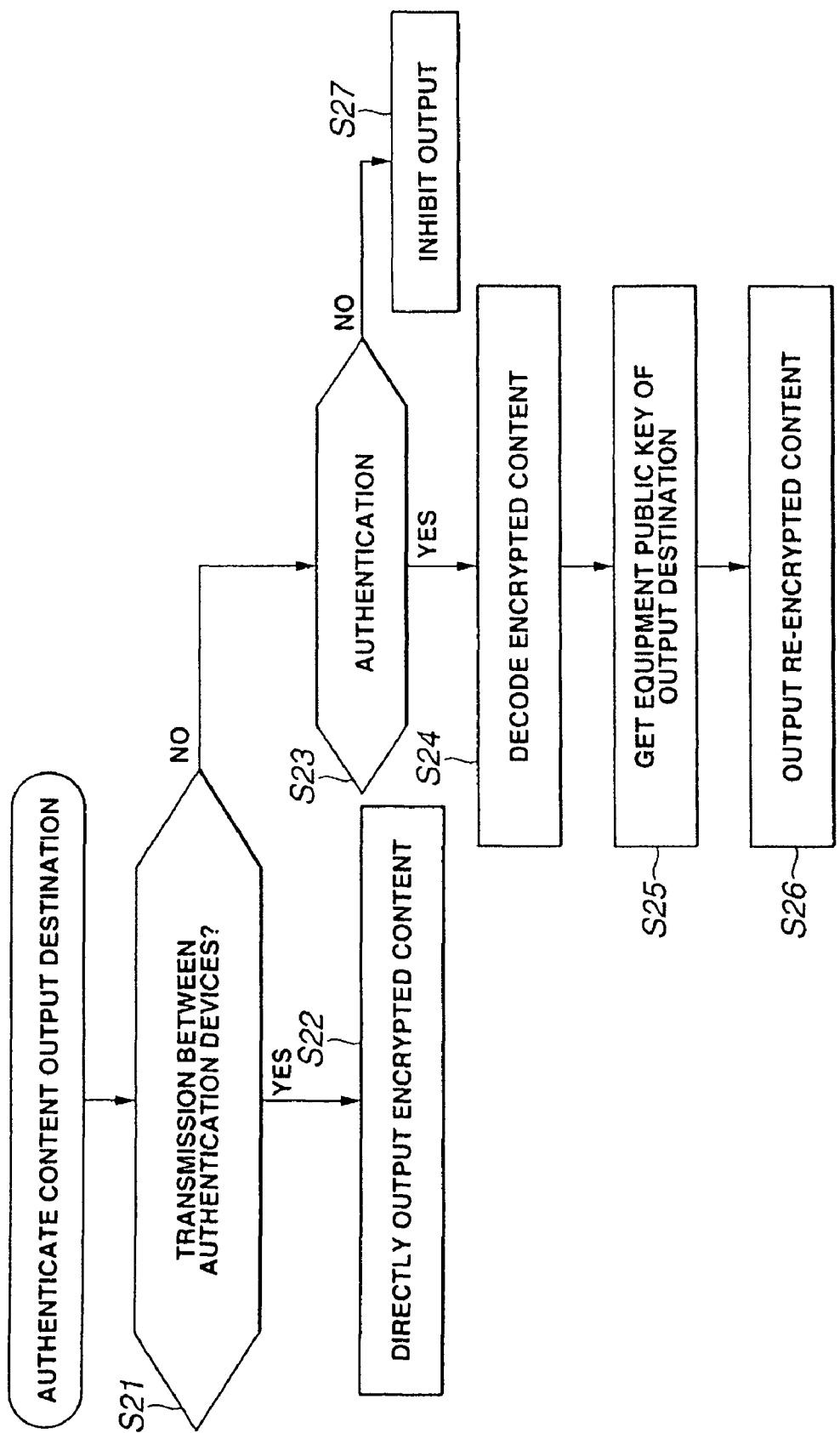
FIG. 9 is a flowchart for illustrating the sequence of operations in transmitting digital data to another device.

Referring to FIGS. 8 and 9, a modified embodiment of the present invention in which digital data can be output not only to the recording and/or reproducing device explained with reference to FIGS. 6 and 7 but also to a personal computer as a general-purpose equipment in case of successful authentication is explained.

Referring to FIG. 8, a recording and/or reproducing device 60 shown therein is configured similarly to the recording and/or reproducing device 2 shown in FIG. 2, except the transmission system, and hence the same reference numerals are used to depict the corresponding parts and the detailed description is omitted for clarity. The recording and/or reproducing device 60 includes, as a transmission system for transmitting the encrypted digital data to the other device, a first authentication circuit 61, a first selector 62, a second authentication circuit 63, a second selector 64, a decoding circuit 65 and a re-encrypting circuit 66. The first authentication circuit 61 performs authentication as to whether the device of the destination of transmission is the same recording and/or reproducing device as the recording and/or reproducing device 2a as the source of transmission. The first selector changes over the route of directly outputting the encrypted digital data and the route of re-encrypting the encrypted digital data to output the so re-encrypted digital data. The second authentication circuit effectuates automatic as to whether the device of the destination of transmission is a general-purpose equipment, such as a personal computer. The second selector permits the outputting of the encrypted digital data when the general-purpose equipment has been authenticated by the second authentication circuit 63. The decoding circuit decodes the encrypted digital data. The re-encrypting circuit re-encrypts the digital data decoded by the decoding circuit 65.

The first authentication circuit 61 authenticates the device of the destination of transmission and controls the switching of the selector 52 based on the results of authentication. That is, if the device of the destination of transmission is the same recording and/or reproducing device as the recording and/or reproducing device 60 as the source of transmission and the digital data is directly sent to this recording and/or reproducing device as the destination of transmission, the first authentication circuit 61 assumes that the transmission of the encrypted digital data is possible, and accordingly changes over the first selector 62 to interconnect the reproducing processing circuit 16 and the communication I/F 21. If the device of the destination of transmission is the same device as the recording and/or reproducing device 60 as the source of transmission but transmission is made via server device 3, or if the digital data is directly sent but the recording and/or reproducing device as the destination of transmission is a general-purpose equipment, such as personal computer, the first authentication circuit 61 disconnects the reproducing processing circuit 16 from the communication I/F 21 and changes over the first selector to disconnect the reproducing processing circuit 16 and the second selector 64 from each other.

The second authentication circuit 63 effectuates authentication as to whether the device of the destination of transmission is the general-purpose equipment, such as personal computer, in which the decoding software has been regularly installed, or is the recording and/or reproducing device as the source of transmission or the general-purpose equipment which operates as a destination of transmission when digital data is transmitted through the server device 3 to a destination of transmission which is the same type as the recording and/or reproducing device 60 as the source of transmission or to the general-purpose equipment, and controls the changeover of the second selector 64 based on the results of authentication. That is, the second authentication circuit 63 switches the second selector 64 to the ON-state of interconnecting the reproducing processing circuit 16 and the decoding circuit 65, through the first selector 62, when encrypted digital data is transmitted to a general-purpose equipment where the decoding software is regularly installed, to a recording and/or reproducing device which is the same type as the recording and/or reproducing device 60 as the source of transmission, through the server device 3, or to the general-purpose equipment, where the decoding software is regularly installed, through the server device 3. When the device as the destination of transmission has not been authenticated, the second authentication circuit 63 changes over the second selector 64 to an OFF state of not interconnecting the reproducing processing circuit 16 and the decoding circuit 65. The second authentication circuit 63 sets a digital data outputting inhibiting state.

In transmitting the digital data, the decoding circuit 65 decodes the digital data, encrypted by the encryption circuit 13 for encryption, to output the decoded digital data to the re-encrypting circuit 66.

The re-encrypting circuit 66 acquires an public key from the general-purpose equipment from the general-purpose equipment, authenticated by the second authentication circuit 63, to re-encrypt the digital data, using the public key. The re-encrypting circuit 66 outputs the re-encrypted digital data to the communication I/F 21.

Referring to FIG. 9, the sequence of operations of the recording and/or reproducing device 60 transmitting digital data to the other device is explained. When the operation of transmitting the encrypted digital data, stored encrypted in the storage unit 15, is performed by the user, the first authentication circuit 61 of the recording and/or reproducing device 60 at step S21 checks whether or not the device of the destination of transmission is the recording and/or reproducing device which is the same type as the recording and/or reproducing device 60 as the source of transmission. That is, the first authentication circuit 61 checks to see whether the digital data is to be directly transmitted to the same recording and/or reproducing device as the recording and/or reproducing device as the destination of transmission or to a device other than the recording and/or reproducing device.

When the device of the destination of transmission has been authenticated to be the same recording and/or reproducing device as the recording and/or reproducing device 60, the first authentication circuit 61 at step S22 changes over the first selector 62 so that the digital data will be output from the reproducing processing circuit 16 to the communication I/F 21. For example, by changing over the first selector 62, the encrypted digital data, read out from the storage unit 15, is sent in the encrypted state from the communication I/F 21 to the recording and/or reproducing device as the destination of transmission, as shown in FIG. 8. In this case, since the recording and/or reproducing device 60 does not re-encrypt the output digital data, the recording and/or reproducing device 60 is able to send the digital data at a high speed. In reproducing the digital data, the recording and/or reproducing device as the destination of transmission decodes and reproduces the data using the common key.

If, at step S21, the first authentication circuit 61 has not authenticated the device of the destination of transmission, the second authentication circuit 63 at step S23 authenticates the device of the destination of transmission. That is, the second authentication circuit 63 checks to see whether the device connected directly or through the server device 3 is the general-purpose equipment where the decoding software has been regularly installed, or whether the device connected through the server device 3 is the same recording and/or reproducing device as the recording and/or reproducing device as the destination of transmission 60.

When the device of the destination of transmission has been authenticated by the second authentication circuit 63, the second authentication circuit 63 changes over the second selector 64, through the first selector 62, to a state of interconnecting the reproducing processing circuit 16 and the decoding circuit 65. At this time, the first selector 62 is changed over so that the output of the reproducing processing circuit 16 will be supplied through the second selector 64 to the decoding circuit 65. The encrypted digital data, read out from the storage unit 15, is input to the decoding circuit 65. The encrypted digital data, read out from the storage unit 15, is input to the decoding circuit 65. The decoding circuit 65 decodes the digital data, encrypted by the encryption circuit 13, for re-encryption, to output the decoded digital data to the re-encrypting circuit 66.

The re-encrypting circuit 66 at step S25 acquires the public key of the device of the destination of transmission. At step S26, the re-encrypting circuit 66 re-encrypts the digital data decrypted by the decoding circuit 65. The communication I/F 20 sends this re-encrypted digital data to the device of the destination of transmission. That is, if, at step S23, the device of the destination of transmission is a general-purpose equipment or transmission is made to the server device 3, the degree of safety is lower than at step S22. In this consideration, the digital data is re-encrypted, using the public key of the device of the destination of transmission, and the so encrypted data is transmitted, to maintain the degree of safety.

If, at step S27, the device of the destination of transmission has not been authenticated, the device of the destination of transmission is not an authentic device. Thus, the second authentication circuit 63 turns off the connection between the reproducing processing circuit 16 and the communication I/F 21. That is, the recording and/or reproducing device 60 inhibits the outputting of the encrypted digital data to the device of the destination of transmission.

The recording and/or reproducing device 60, described above, permits the outputting of the encrypted digital data only when the digital data can be sent in a completely safe environment, that is when the digital data is directly output to the recording and/or reproducing device 60, to effect safe digital data transmission/reception. Since the digital data, saved in the storage unit 15 in an encrypted state, is transmitted to the recording and/or reproducing device 60 as the destination of transmission, without encryption, the recording and/or reproducing device 60 as the destination of transmission is able to output the digital data at a high speed. If the digital data is not output directly to the recording and/or reproducing device 60, but the device of the destination of transmission has been authenticated, the digital data can be sent to the other device as the degree of safety is maintained by the encryption. That is, in the present embodiment, the number of the types of the devices to which digital data can be output can be more than in the embodiment of FIGS. 6 and 7.

Figure 10:
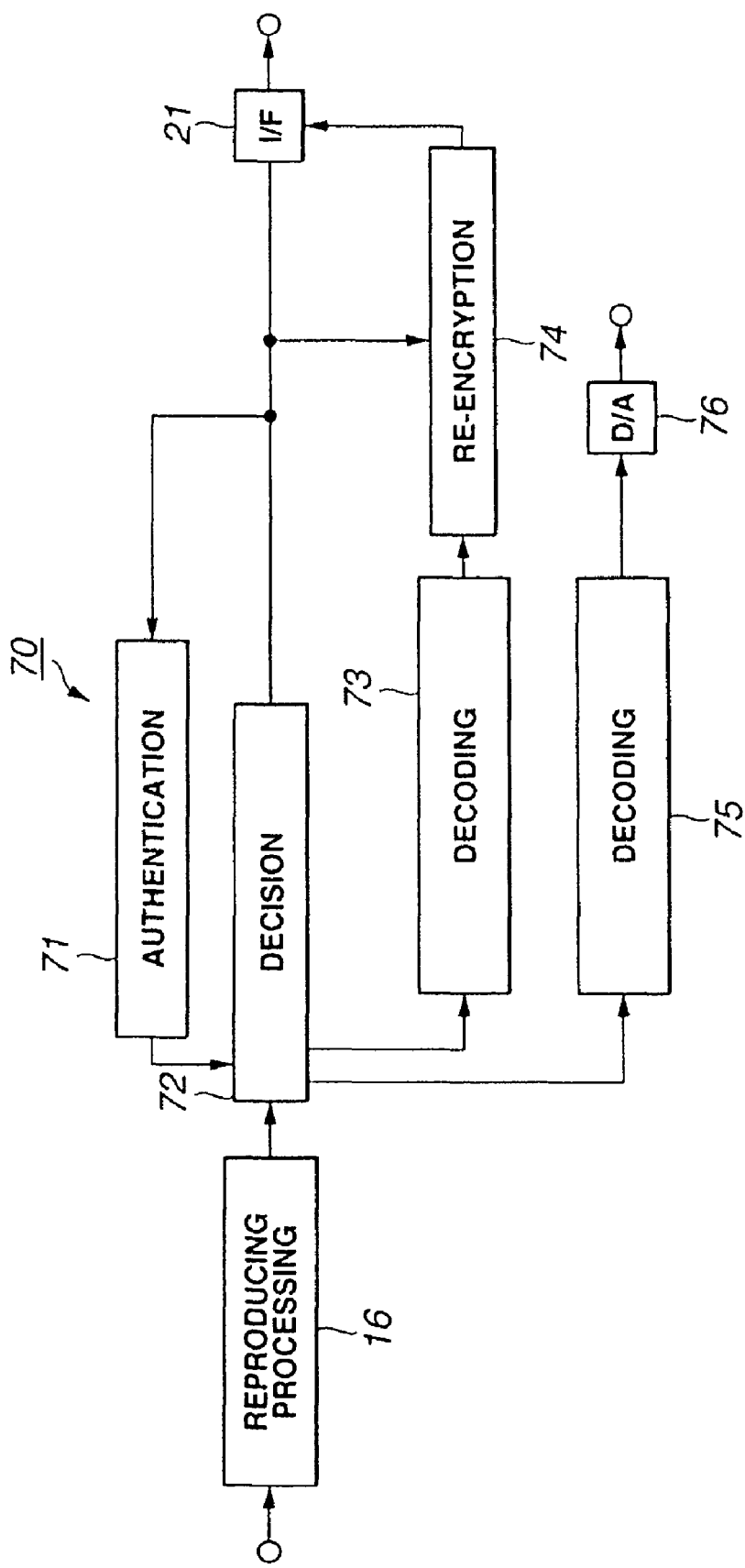
FIG. 10 is a block diagram of a recording and/or reproducing apparatus as a dedicated device.
Figure 11:
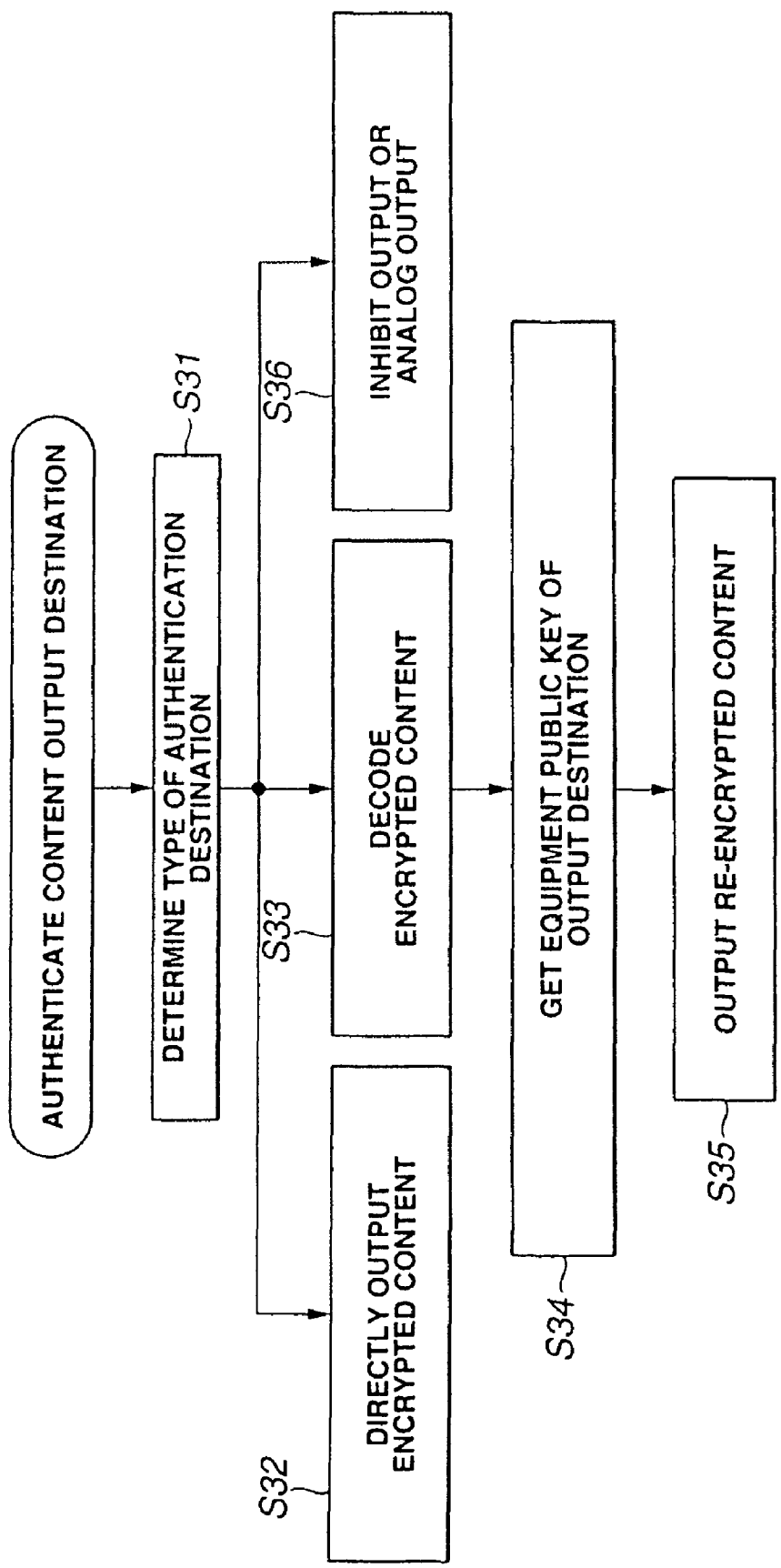
FIG. 11 is a flowchart for illustrating the sequence of operations in transmitting digital data to another device.

Referring to FIGS. 10 and 11, an embodiment of a recording and/or reproducing device 70, in which the outputting method can be changed depending on the characteristics of the device of the destination of transmission, is now explained. Since this recording and/or reproducing device 70 is substantially similar to the recording and/or reproducing device 2 of FIG. 2, except the transmission system, common parts are indicated by the same reference numerals. The recording and/or reproducing device 70 includes, as a transmission system of transmitting the encrypted digital data to the other device, an authentication circuit 71, a decision circuit 72, a decoding circuit 73 and a re-encrypting circuit 74. The authentication circuit authenticates the device of the destination of transmission. The decision circuit discriminates the sort of the device of the destination of transmission depending on the results of authentication by the authentication circuit 71. The decoding circuit decodes the encrypted digital data output from the reproducing processing circuit 16. The re-encrypting circuit re-encrypts the digital data decrypted by the decoding circuit 73. In addition, for converting the digital data into output analog signals, the recording and/or reproducing device 70 includes a decoding circuit 75 for decrypting the digital data output from the reproducing processing circuit 16 and a D/A converter 76 for converting the digital data into analog data.

The authentication circuit 71 authenticates the device of the destination of transmission. Specifically, the authentication circuit 71 performs authentication as to whether or not the device of the destination of transmission is authorized, that is whether the device of the destination of transmission is the recording and/or reproducing device which is the same type as the recording and/or reproducing device 70 as the source of transmission, a general-purpose equipment, such as a personal computer, where the software for utilization of the present system has been regularly installed, or is the same recording and/or reproducing device as the recording and/or reproducing device 70 as the source of transmission, or a general-purpose equipment connected through the server device 3. The authentication circuit 71 outputs the sort of the authenticated device and the results of authentication to the decision circuit 72. The authentication circuit 71 interconnects e.g., the recording and/or reproducing device 70 as the source of transmission and the device of the destination of transmission by a cable conforming to the IEEE 1394 standard to exchange signals pursuant to the IEEE 1394 standard to effect authentication.

The decision circuit 72 discriminates the sort of the device of the destination of transmission, transmitting the encrypted digital data, depending on the output which is based on the results of authentication from the authentication circuit 71. When sending the digital data directly to the recording and/or reproducing device which is the same type as the authenticated device of the source of transmission, the decision circuit 72 sends the digital data from the reproducing processing circuit 16 to the communication I/F 20. When sending the digital data directly to the general-purpose equipment or indirectly through the server device 3 to a recording and/or reproducing device which is the same type as the recording and/or reproducing device 70, or the general-purpose equipment, the decision circuit 72 sends the digital data from the reproducing processing circuit 16 to the decoding circuit 73. If the device transmitting the digital data is not authorized, that is, has not been authenticated, the decision circuit 72 inhibits the outputting of the digital data through the communication I/F 20, or sends the digital data from the reproducing processing circuit 16 to the decoding circuit 75.

In sending the digital data, the decoding circuit 73 decodes the digital data encrypted by the encryption circuit 13, for re-encryption, to output the decoded digital data to the re-encrypting circuit 74.

The re-encrypting circuit 74 acquires an public key from the recording and/or reproducing device as the destination of transmission, authenticated by the authentication circuit 71, or from the general-purpose equipment, to encrypt the digital data using this public key. The re-encrypting circuit 74 outputs the re-encoded digital data to the communication I/F 21.

The decoding circuit 75 decodes the digital data, encrypted by the encryption circuit 13, for outputting analog signals, to output the analog signals to a D/A converter 76, which D/A converter 76 converts the digital data into analog signals, which are output as analog signals from the device 70.

Referring to FIG. 11, the sequence of operations when the recording and/or reproducing device 70 as the source of transmission sends digital data to the other device is explained. When the user performs the transmission processing of sending the encrypted digital data stored in the storage unit 15, the authentication circuit 71 of the recording and/or reproducing device 70 as the source of transmission at step S31 performs the authentication as to whether the device of the destination of digital data transmission is an authorized one, and outputs the results of authentication and the sort of the authenticated device to the decision circuit 72. Depending on the results of authentication, the decision circuit 72 checks to see whether the encrypted digital data from the reproducing processing circuit 16 is to be output to the communication I/F 20 or to the decoding circuit 73, inhibited from being output, or output to the decoding circuit 75.

When the decision circuit 72 has determined that the digital data is to be sent directly to the recording and/or reproducing device which is the same type as the recording and/or reproducing device 70 as the destination of transmission, the decision circuit 72 at step S32 outputs the encrypted digital data output from the reproducing processing circuit 16 to the communication I/F 21. Since the encrypted digital data is read out from the storage unit 15 in a safe device-to-device communication environment, the encrypted digital data is sent in the encrypted state from the communication I/F 21 to the recording and/or reproducing device as the source of transmission. Since the recording and/or reproducing device 70 as the source of transmission does not re-encrypt the digital data, which is transmitted, it is possible to send the digital data at a high speed. In reproducing the digital data, the recording and/or reproducing device as the destination of transmission decodes and reproduces the transmitted digital data using a common key.

When the decision circuit 72 has determined that the digital data is to be sent to a general-purpose equipment directly connected to the device of the source of transmission, which is the device of the destination of transmission, or to a recording and/or reproducing device, which is the same type as the recording and/or reproducing device 70 as the source of transmission, or to the general-purpose equipment, through the server device 3, the decision circuit at step S33 sends the digital data from the reproducing processing circuit 16 to the decoding circuit 73. For re-encryption, the decoding circuit 73 decodes the encrypted digital data, which is supplied from the reproducing processing circuit 16 and which is encrypted in the encryption circuit 13, to output the decoded digital data to the re-encrypting circuit 74. At step S34, the re-encrypting circuit 74 acquires the public key of the device of the destination of transmission. At step S35, the re-encrypting circuit 74 re-encrypts the digital data, decrypted by the decoding circuit 73, using the public key of the device of the destination of transmission acquired. The communication I/F 20 sends the re-encrypted digital data to the device of the destination of transmission. That is, if the device of the destination of transmission is the general-purpose equipment or if transmission is made to the server device 3, the degree of safety is lower than in the case of step S32. Consequently, the digital data is re-encrypted, using the public key of the device of the destination of transmission and transmitted encrypted to maintain data safety in transmission.

If the decision circuit 72 at step S36 has determined that the device of the destination of digital data transmission is an unauthorized device, it inhibits the outputting of the digital data at step S36. Alternatively, the decision circuit 72 at step S36 permits only the outputting in the analog signal form. In case of the analog outputting, the decision circuit 72 sends digital data from the reproducing processing circuit 16 to the decoding circuit 75. The decoding circuit 75 decrypts the digital data, supplied from the reproducing processing circuit 16 and encrypted by the encryption circuit 13, for re-encryption, to output the decoded digital data to the D/A converter 76. As a result, the digital data converted into analog signals are output from the device 70.

In the above-described recording and/or reproducing device 70, the digital data output from the device 70 is directly output, output encrypted, or converted into analog signals and output in this form. That is, if the digital data is sent directly to the recording and/or reproducing device which is the same type as the recording and/or reproducing device 70 as the source of transmission, the degree of safety may be determined to be high because the data is being transmitted between the devices of the same type. Thus, the recording and/or reproducing device 70 sends the encrypted digital data in the storage unit 51 directly to the recording and/or reproducing device 2b as the destination of transmission, without re-encrypting the output digital data, in order to shorten the transmission time. In the general-purpose equipment, such as the personal computer, in which is installed the decoding software used in the present system, it may be an occurrence that the software has been illicitly installed, such that the degree of safety is lower than in the case of the digital data transmission between the devices of the same type as discussed above. When digital data is transmitted through the server device 3 to the recording and/or reproducing device of the same type as the recording and/or reproducing device 70 as the source of transmission, there is a risk that the digital data held by the server device 3 is downloaded by the device which has illicitly accessed the server device 3, and hence the degree of safety is lower than in case of digital data transmission between the devices of the same type as described above. In such case, the recording and/or reproducing device 70 as the source of transmission re-encrypts the output digital data, using the public key of the device of the destination of transmission, to maintain the degree of safety at the time of or following the transmission of the digital data.

Although the case of transmitting encrypted digital data has been explained above, the RSA cryptogram or the elliptical cryptogram, as the public key cryptographic system, or the EKB or MJR, as the secret key system higher in encrypting speed than the public key system, may also be used as the specified methods for encryption. If, for example, the recording and/or reproducing device 70 as the source of transmission is of the same type as the recording and/or reproducing device as the destination of transmission, the public key system with the high encryption speed may be used. On the other hand, the public key system with higher safety may be used in the data transmission to the general-purpose equipment or in the digital data transmission through the server device 3.

In the above-described embodiments, it has been stated that digital data is transmitted without the processing of re-encryption in case the recording and/or reproducing devices 50, 60 and 70 as the source of transmission are of the same type as the recording and/or reproducing device as the destination of transmission. It is however unnecessary for the device of the source of transmission to be of the same type as the device of the destination of transmission. That is, it is only sufficient if the devices are provided at least with the functions of encryption and decoding shown in FIGS. 2 to 4.

A recording and/or reproducing device 80, in which the duplication management information of limiting the duplication of digital data as the copyright management data is included in the digital data sent from the recording and/or reproducing device 2 and in which recording of the digital data is limited based on this truant duplication prohibiting information, is now explained with reference to the drawings.

Figure 12:
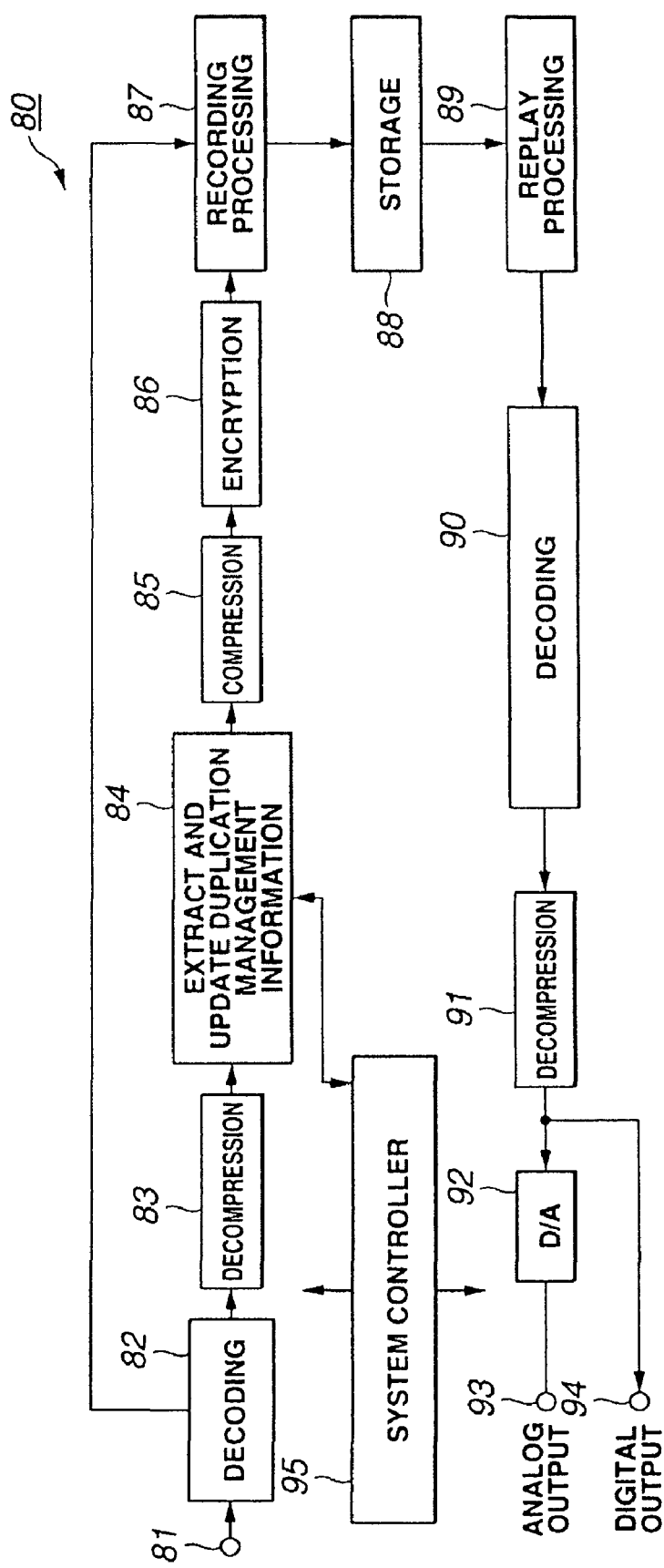
FIG. 12 is a block diagram of a recording and/or reproducing apparatus for updating the truant duplication inhibiting information in case of downloading the digital data including the truant duplication inhibiting information transmitted over the network.

This recording and/or reproducing device 80 includes an input terminal 81, to which encrypted compressed digital data is input from the server device 3, as shown in FIG. 12. This recording and/or reproducing device 80 includes, as a recording system, a decoding circuit 82, for decoding the encrypted digital data, an decompressing circuit 83, for decompressing the compressed digital data, an extraction updating circuit 84, for extracting and rewriting the truant duplication inhibiting information from the digital data, a compression circuit 85 for compressing the digital data, and an encrypting circuit 86 for encrypting the compressed digital data. This recording and/or reproducing device 80 includes, as the recording system, a recording processing circuit 87 for recording processing the encrypted digital data and a storage unit 88 for storing the encrypted digital data.

The recording and/or reproducing device 80 includes, as a reproducing system, a replay processing circuit 89, a decoding circuit 90 for decrypting the digital data processed for reproduction by the replay processing circuit 89, an decompressing circuit 91 for decompressing the digital data from the decoding circuit 90, a D/A converter 92 for converting the digital signals from the decompressing circuit 91 into analog signals, an analog output terminal 93 for outputting the analog signals, and a digital output terminal 94 for outputting the digital data upstream of the D/A converter 92. The recording and/or reproducing device 80 also includes a system controller 95 for controlling the overall operations.

To the input terminal 81 are input encrypted compressed digital data, such as audio or video data, or picture data, from the server device 3 or from the recording and/or reproducing device. In this digital data, the SCMS (serial copy management system) information as the duplication management information, as watermarked information. The decoding circuit 82 decrypts the decoded digital data, input at the input terminal 81, as in the decoding circuits 19 and 22 shown in FIG. 4, to extract the duplication management information contained in the digital data to output the so extracted information to the decompressing circuit 83. The decompressing circuit 83 expands the digital data, compressed in accordance with the ATRAC3 (Adaptive Transform Acoustic Coding 3: trademark), MPEG-2AAC (Motion Picture Expert Group 2 Advanced Audio Coding), MP3 (MPEG-1 Audio Layer 3), TwinVQ (Transform-Domain Weighted Interleave Vector Quantization: trademark), MS Audio (WMA: Windows Media Audio: trademark), or Ogg Vorbis (trademark), to output the expanded digital data to the extraction updating circuit 84.

The extraction updating circuit 84 extracts watermarks contained in the decoded expanded digital data to detect the SCMS information. This SCMS information is a duplication management flag provided in the leading two bits of the data. These two bits are comprised of [00] (digital duplication permit), [10] (digital duplication inhibit) and [11] (permit digital duplication only once).

When the SCMS information is [00] or [11], the extraction updating circuit 84 permits recording of digital data in the storage unit 88. When the SCMS information is [11], [11] is rewritten to [10]. If the SCMS information is [10], the extraction updating circuit 84 inhibits recording of digital data in the storage unit 88. The extraction updating circuit 84 outputs the digital data, having the updated SCMS information, to the compression circuit 85.

The duplication management information may be the CGMS (Copy Generation management System) in place of being the SCMS information. In the case of the CGMS, two-bit CCI (Copy Control Information) of [11] (no digital duplication permitted), [10] (no further digital duplication permitted), [01] (digital duplication is permitted only once] and [00] (digital duplication allowed freely), are embedded in the digital data. Of course, the duplication management information is not limited to SGMS nor to CGMS.

The compression circuit 85 compresses the digital data in accordance with any one of the systems of ATRAC3, MPEG-2AAC, MP3, TwinVQ, MS Audio and Ogg Vorbis to output the results to the recording processing circuit 87. The recording processing circuit 87 applies error correction coding or modulation to the input data. The data processed for recording by the recording processing circuit 87 is recorded, by a head unit of, for example, a magnetic head or an optical pickup, on a recording medium, forming a storage unit 88, such as a hard disc, a recordable optical disc or a magneto-optical disc. It should be noted that the storage unit 88 may be enclosed in the main body unit of the device 80 or may be removably mounted on the main body unit of the device 80.

The data stored in the storage unit 88 is read out by the head unit of the magnetic head or the optical pickup so as to be output to the replay processing circuit 89. The replay processing circuit 89 binary-encodes the output signal read out from the storage unit 88 to modulate or error-correct the binary signals to output the resulting signals to the decoding circuit 90. The decoding circuit 90 decrypts the encrypted digital data output from the replay processing circuit 89 to output the decoded data to the decompressing circuit 91.

The decompressing circuit 91 expands the compressed digital data from the compression circuit 85 in accordance with ATRAC3, MPEG-1AAC, MP3, TwinVQ, MS Audio or Ogg Vorbis, to output the resulting data to the D/A converter 92 or to the digital output terminal 94. The D/A converter 92 converts the digital signals output from the decompressing circuit 91 into analog signals which are output to the analog output terminal 93. To the analog output terminal 93 is connected e.g., a loudspeaker which transduces the analog signals output from the output terminal 93 to produce the output audio sound.

The system controller 95 controls the overall device. For example, if the SCMS information, extracted and detected from the input digital data is [00], [11], the system controller 95 controls the recording processing circuit 87 to record the digital data in the storage unit 88. If the detected SCMS information is [10], the system controller 95 controls the recording processing circuit 87 to inhibit the recording of the digital data on the storage unit 88. If the SCMS information is [11], the system controller 95 controls the extraction updating circuit 84 to rewrite [11] to [10].

In the system employing the recording and/or reproducing device 80, the digital data, such as the audio data, encrypted in accordance with the aforementioned preset systems, are uploaded from the recording and/or reproducing device of the same type as the recording and/or reproducing device 80 as the source of transmission to the server device 3. In thus encrypted digital data is embedded the aforementioned SCMS information. If the so uploaded digital data is the data which allows the digital duplication freely, the SCMS information, embedded in the digital data, is set to [00], whereas, if the uploaded digital data is data which allows digital duplication only once, the SCMS information is set to [11]. If the uploaded digital data is data which inhibits digital duplication, the SCMS information is set to [10]. On receipt of the encrypted digital data from the recording and/or reproducing device as the source of transmission, the server device 3 transiently directly stores the data in a storage unit formed by e.g., a hard disc. That is, the server device 3 does not have the function of decoding and reproducing the encrypted digital data. Consequently, the server device 3 lacks in the possibility of decoding and reproducing the digital data stored in the storage unit, even in future, so that the SCMS information is not updated.

Figure 13:
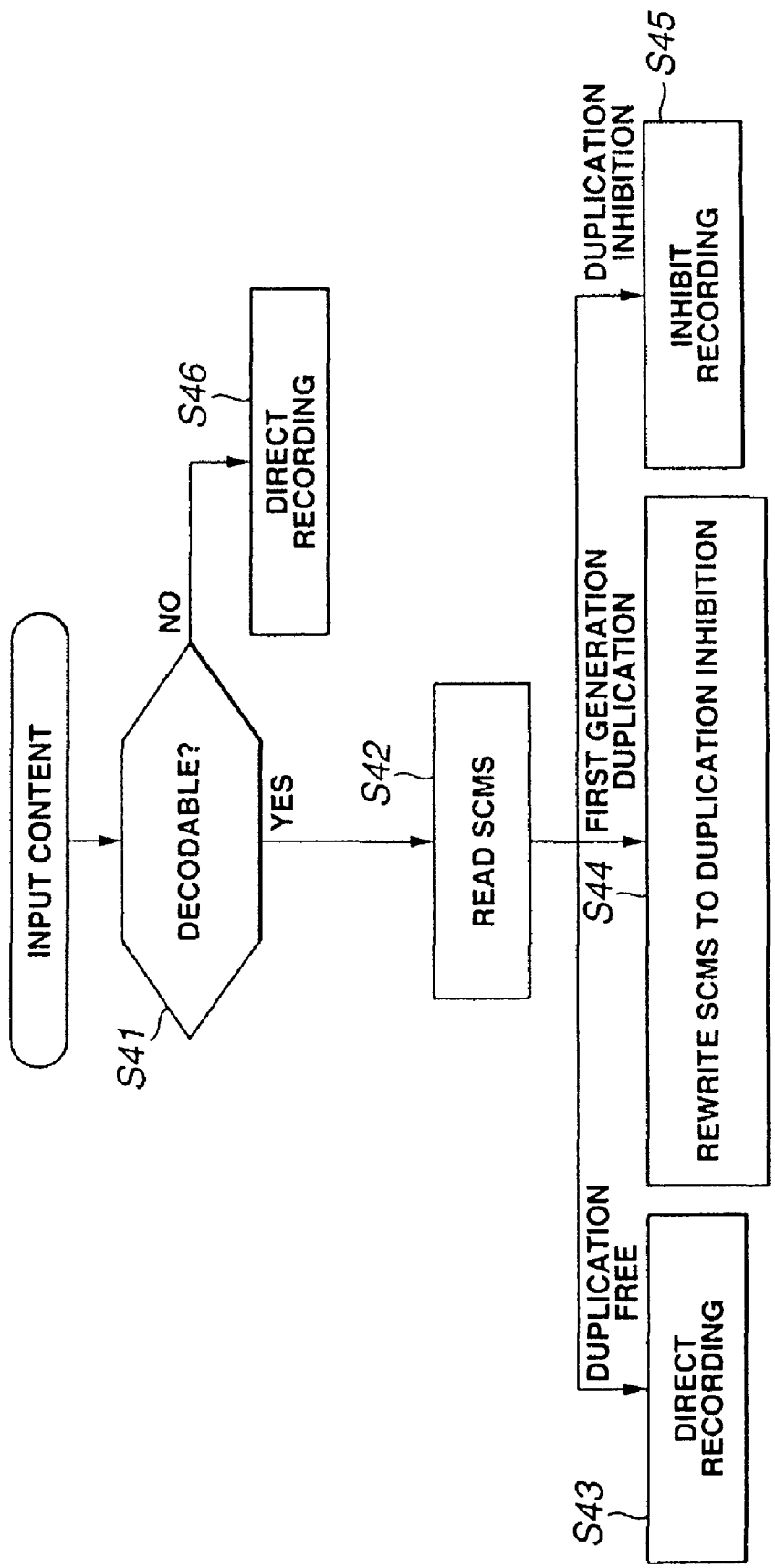
FIG. 13 is a flowchart for illustrating the operation of the recording and/or reproducing apparatus shown in FIG. 13.

Referring to FIG. 13, the recording and/or reproducing device 80 as the destination of transmission accesses the server device 3 to download a desired portion of the digital data stored in the server device 3 the digital data downloaded to the device of the destination of transmission is input to the decoding circuit 82. Since the recording and/or reproducing device as the destination of transmission is of the same structure as the recording and/or reproducing device 80, the operation of the device of the destination of transmission is explained using the same reference numerals as those shown in FIG. 12. The system controller 95 at step S41 checks to see if the downloaded digital data is decodable by the decoding circuit 82. If the downloaded digital data is decodable, the system controller 95 proceeds to step S42 and, if otherwise, the system controller 95 proceeds to step S46. Since the digital data held by the server device 3 has been encrypted based on the innate key of the device of the destination of transmission, that is the recording and/or reproducing device 80, the decoding circuit 82 decrypts the digital data input from the input terminal 81, based on the innate key of the device 80, and the results are sent to the system controller 95, by way of executing the decision step S41.

On decoding the downloaded digital data, the decoding circuit 82 outputs the decoded digital data to the decompressing circuit 83, which decompressing circuit 83 then decompresses the digital data supplied from the decoding circuit 82 to output the resulting data to the extraction updating circuit 84. The extraction updating circuit 84 extracts the watermark, inclusive of the SCMS information, from the digital data supplied from the decompressing circuit 83, to input the extracted SCMS information to the system controller 95. The system controller 95 at step S42 checks to see if the SCMS information supplied is [00], [11] or [10].

Based on the read-out results of the SCMS information at step S42, the system controller 95 at step S43 controls the recording processing circuit 87 so that, if the SCMS information is [00], digital data will be recorded in the storage unit 88.

The system controller 95 at step S44 controls the recording processing circuit 87 so that, if the SCMS information is [11], recording the digital data in the storage unit 88 will be allowed, while controlling the extraction updating circuit 84 to rewrite the SCMS information from [11] to [10]. Moreover, based on a command from the system controller 95, the extraction updating circuit 84 rewrites the SCMS information from [11] to [10].

If the recording to the storage unit 88 is permitted at steps S43, S44, data of the extraction updating circuit 84 is sent to the compression circuit 85, which compression circuit 85 re-compresses the digital data to output the resulting data to the encrypting circuit 86. The encrypting circuit 86 re-encrypts the data in accordance with a preset system to output the resulting re-encrypted data to the recording processing circuit 87. The recording processing circuit 87 performs the processing necessary for recording to send the resulting data to the storage unit 88, which storage unit 88 records the encrypted compressed digital data on the recording medium of the storage unit 88 based on the output of the recording processing circuit 87.

When the SCMS information is [10], the system controller 95 at step S45 controls the recording processing circuit 87 to inhibit the recording of the digital data in the storage unit 88. At this time, the recording processing circuit 87 displays an alarm on, for example, a display unit, that digital data cannot be recorded.

If the system controller 95 has determined at step S41 that the cryptogram applied to the digital data supplied by the decoding circuit 82 cannot be decoded, the system controller 95 at step S46 directly outputs the data to the recording processing circuit 87. The recording processing circuit 87 applies necessary processing for recording to the digital data. The storage unit 88 records encrypted compressed digital data on a recording medium forming the storage unit 88.

When the encrypted compressed digital data, recorded in the storage unit 88 in the processing of steps S43 or S44, is to be reproduced, the digital data stored in the storage unit 88 is read out from the storage unit 88 and processed for replay by the replay processing circuit 89 so as to be output to the decoding circuit 90 of the reproducing system. The decoding circuit 90 decodes the output data of the replay processing circuit 89 to send the resulting data to the decompressing circuit 91. The decompressing circuit 91 decompresses the compressed digital data to output the decompressed data to the D/A converter 92 or to the digital output terminal 94. The D/A converter 92 converts the digital signals supplied from the decompressing circuit 91 into analog signals which are output through analog output terminal 93 to for example the loudspeaker.

In the above-described system employing the recording and/or reproducing device 80 shown in FIG. 12, the SCMS information is not updated in the server device 3 unable to decode the encrypted digital data, and the SCMS information is updated when the digital data is downloaded to a recording and/or reproducing device which is of the same type as the replay enabling recording and/or reproducing device 80 as the source of transmission. Consequently, with the present system, the pre-existing duplication management information can be managed even in cases wherein the digital data is transmitted or received over the network 5.

According to the present invention, the processing executed in the recording and/or reproducing device 2 and that executed in the recording and/or reproducing device 80 can be combined together. That is, when the digital data including the duplication management information is to be sent through the server device 3 to the device of the destination of transmission, the recording and/or reproducing device as the source of transmission may acquire the innate key of the device of the destination of transmission to encrypt the digital data using the so acquired innate key to send the encrypted digital data to the device of the destination of transmission. Since the server device does not have the reproducing function, it may not update the duplication management information. The recording and/or reproducing device as the destination of transmission may update the duplication management information in case it is able to decode the received digital data.

INDUSTRIAL APPLICABILITY

According to the present invention, in which, when encrypted data recorded on the recording medium is sent to the server device, an attempt is made to authenticate the device of the destination of transmission and, when the device of the destination of transmission has been authenticated, the encrypted data recorded on the recording medium is decoded and re-encrypted with the aid of the innate key data acquired from the device of the destination of transmission so as to be sent to outputting means. Consequently, when the data is transiently stored in the server device and downloaded to a terminal device of an unauthorized third party, it is prohibited from being reproduced to protect the copyright.

Moreover, according to the present invention, if truant duplication inhibiting information is included in data downloaded from the server device, the truant duplication inhibiting information is extracted and updated by extraction updating means only when the data is recorded on a replay enabling device to manage the pre-existing truant duplication inhibiting information.

The invention claimed is:

1. A data transmission device, comprising:
a storage unit for storing encrypted data;
an authentication unit for authenticating a device that is to be a destination of transmission;
a selection unit for selectively supplying the encrypted data read out from the storage unit, the selection unit being controlled by an authentication result received from the authentication unit;
a re-encryption unit for decoding the encrypted data supplied from the selection unit and for re-encrypting the decoded data; and
an output unit to which one of the encrypted data from the selection unit and the re-encrypted data from the re-encryption unit is supplied;
the selection unit supplying the encrypted data read out from the storage unit to the re-encryption unit when the device that is to be the destination of transmission has been authenticated by the authentication unit so that the output unit is supplied with the re-encrypted data from the re-encryption unit, and supplying the encrypted data read out from the storage unit directly to the output unit when the device that is to be the destination of transmission has not been authenticated by the authentication unit.

2. The data transmission device according to claim 1, wherein the output unit is supplied with output data received from the re-encryption unit.

3. The data transmission device according to claim 2, wherein when the device that is to be the destination of transmission has not been authenticated, the selection unit sends data read out from the storage unit to the output unit.

4. The data transmission device according to claim 2, wherein when the device that is to be the destination of transmission has not been authenticated by the authentication unit to be a device that is directly supplied with data from the transmission device, the selection unit sends the data read out from the storage unit to the output unit.

5. The data transmission device according to claim 1, wherein the re-encryption unit includes a decoding unit for decoding the data read out from the storage unit and a re-encryption circuit for re-encrypting output data from the decoding unit using innate key data acquired from the device authenticated by the authentication unit.

6. The data transmission device according to claim 1, wherein the re-encryption unit re-encrypts a data part, excluding a header, of the data read out from the storage unit.

7. The data transmission device according to claim 1, wherein the authentication unit includes a first authentication circuit unit and a second authentication circuit unit; when the device that is to be the destination of transmission has not been authenticated by the first authentication circuit unit, the device that is to be the destination of transmission is authenticated by the second authentication circuit unit, and when the device that is to be the destination of transmission has been authenticated by the second authentication circuit unit, the decoded data is re-encrypted using innate key data acquired from the device that is to be the destination of transmission as authenticated by the second authentication circuit unit to output the re-encrypted data to the device that is to be the destination of transmission.

8. The data transmission device according to claim 7, wherein when the device that is to be the destination of transmission has not been authenticated by the second authentication circuit unit, outputting of the data read out from the storage unit is inhibited.

9. The data transmission device according to claim 7, wherein the selection unit sends data read out from the storage unit to the re-encryption unit when the device that is to be the destination of transmission has not been authenticated by the first authentication circuit unit.

10. The data transmission device according to claim 7, wherein when the device that is to be the destination of transmission has been authenticated by the first authentication circuit unit to be a device directly supplied with data from the transmission device, the selection unit outputs the data read out from the storage unit to the outputting unit.

11. The data transmission device according to claim 7, further comprising a further selection unit provided between the selection unit and the re-encryption unit, the further selection unit being changed over by the second authentication circuit unit.

12. The data transmission device according to claim 1, further comprising a decision unit for checking, based on the results of authentication by the authentication unit, whether the data read out from the storage unit is to be supplied to the re-encryption unit.

13. The data transmission device according to claim 12, wherein the decision unit sends data read out from the storage unit to the re-encryption unit when the device that is to be the destination of transmission has been authenticated by the authentication unit.

14. The data transmission device according to claim 13, further comprising an outputting unit supplied with output data from the re-encryption unit, and wherein when the device that is to be the destination of transmission has been authenticated by the authentication unit to be a device to which data is directly transmitted from the transmission device, the data read out from the storage unit is sent to the output unit.

15. A recording and/or reproducing device, comprising:
an encryption unit for encrypting supplied data;
a storage unit in which the data encrypted by the encryption unit is stored;
an authentication unit for authenticating a device that is to be a destination of transmission;
a selection unit for selectively supplying the encrypted data read out from the storage unit, the selection unit being controlled by an authentication result received from the authentication unit;
a replay processing unit for replay processing data read out from the storage unit;
a re-encryption unit for decoding the encrypted data supplied from the replay processing unit and for re-encrypting the decoded data; and
an output unit to which one of the encrypted data from the selection unit and the re-encrypted data from the re-encryption unit is supplied;
the selection unit supplying the encrypted data read out from the storage unit to the re-encryption unit when the device that is to be the destination of transmission has been authenticated by the authentication unit so that the output unit is supplied with the re-encrypted data from the re-encryption unit, and supplying the encrypted data read out from the storage unit directly to the output unit when the device that is to be the destination of transmission has not been authenticated by the authentication unit.

16. The recording and/or reproducing device according to claim 15, wherein the output unit is supplied with output data from the re-encryption unit.

17. The recording and/or reproducing device according to claim 16, wherein when the device that is to be the destination of transmission has not been authenticated by the authentication unit, output data from the replay processing unit is sent to the output unit.

18. The recording and/or reproducing device according to claim 16, wherein when the device that is to be the destination of transmission has been authenticated by the authentication unit as being a device to which data can be directly transmitted from the transmission device, output data from the replay processing unit is sent to the output unit.

19. The recording and/or reproducing device according to claim 15, wherein the re-encryption unit includes a decoding unit for decoding output data received from the replay processing unit and a re-encryption circuit unit for re-encrypting output decoded data received from the decoding unit using innate key data acquired from a device authenticated by the authentication unit.

20. The recording and/or reproducing device according to claim 15, wherein the re-encryption unit encrypts a data part of output data received from the replay processing unit, except for a header.

21. The recording and/or reproducing device according to claim 15, wherein the authentication unit includes a first authentication circuit unit and a second authentication circuit unit, and when the device that is to be the destination of transmission has not been authenticated by the first authentication circuit unit, the device that is to be the destination of transmission is authenticated by the second authentication circuit unit, and when the device that is to be the destination of transmission has been authenticated by the second authentication circuit unit, the decoded data is re-encrypted using innate key data acquired from the device which is to be the destination of transmission authenticated by the second authentication circuit unit to output the re-encrypted data to the device that is to be the destination of transmission.

22. The data transmission device according to claim 21, wherein when the device that is to be the destination of transmission has not been authenticated by the second authentication circuit unit, outputting of the data read out from the storage unit is inhibited.

23. The recording and/or reproducing device according to claim 21, further comprising an output unit supplied with output data from the re-encryption device, and a selection unit for selectively supplying output data from the replay processing unit to one of the re-encryption unit and the output unit based on the results of authentication by the first authentication circuit unit.

24. The recording and/or reproducing device according to claim 23, wherein when the device that is to be the destination of transmission has not been authenticated by the first authentication circuit unit, the selection unit sends output data from the replay processing unit to the re-encryption unit.

25. The recording and/or reproducing device according to claim 23, wherein when the device that is to be the destination of transmission has been authenticated by the first authentication circuit unit as being a device to which data is directly transmitted from the transmission device, the selection unit sends output data from the replay processing unit to the output unit.

26. The recording and/or reproducing device according to claim 23, further comprising a further selection unit provided between the selection unit and the re-encryption unit and being changed over by the second authentication circuit unit.

27. The recording and/or reproducing device according to claim 15, further comprising a decision unit for determining, based on the result of authentication by the authentication unit, whether or not output data from the replay processing unit is to be supplied to the re-encryption unit.

28. The recording and/or reproducing device according to claim 15, wherein when the device that is to be the destination of transmission has been authenticated by the authentication unit, the decision unit sends output data from the replay processing unit to the re-encryption unit.

29. The recording and/or reproducing device according to claim 28, further comprising an output unit supplied with output data from the re-encryption unit; the decision unit sending output data from the replay processing unit to the output unit when the device that is to be the destination of transmission has been authenticated by the authentication unit to be a device to which data is directly transmitted from the transmission device.

* * * * *